United States Patent
McKenzie et al.

(10) Patent No.: US 11,900,928 B2
(45) Date of Patent: Feb. 13, 2024

(54) SYSTEM AND METHOD FOR ADAPTED INTERACTIVE EXPERIENCES

(71) Applicant: SoundHound, Inc., Santa Clara, CA (US)

(72) Inventors: Joel McKenzie, San Francisco, CA (US); Qindi Zhang, Los Altos, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 414 days.

(21) Appl. No.: 15/853,780

(22) Filed: Dec. 23, 2017

(65) Prior Publication Data
US 2019/0198016 A1  Jun. 27, 2019

(51) Int. Cl.
G10L 15/22 (2006.01)
G06Q 30/0251 (2023.01)
G10L 15/18 (2013.01)
G10L 15/19 (2013.01)

(52) U.S. Cl.
CPC .......... *G10L 15/22* (2013.01); *G06Q 30/0267* (2013.01); *G06Q 30/0271* (2013.01); *G10L 15/1815* (2013.01); *G10L 15/19* (2013.01)

(58) Field of Classification Search
None
See application file for complete search history.

(56) References Cited

U.S. PATENT DOCUMENTS

| 8,612,226 | B1 | 12/2013 | Epstein et al. |
| 8,630,851 | B1 * | 1/2014 | Hertschuh .......... G06Q 30/0641 704/235 |
| 9,633,371 | B1 | 4/2017 | Mohajer et al. |
| 10,034,050 | B2 * | 7/2018 | Zavesky ............ H04N 21/8153 |

(Continued)

FOREIGN PATENT DOCUMENTS

| CN | 1342290 A | 3/2002 |
| CN | 101651699 A | 2/2010 |

(Continued)

OTHER PUBLICATIONS

Ayer, Mike, Interactive Graphic Novels: A Hybrid Advertising Technique, The Elon Journal of Undergraduate Research in Communications, Fall 2014, pp. 42-50, vol. 5, No. 2, Strategic Communications Elon University, Elon, North Carolina.

(Continued)

*Primary Examiner* — Thuykhanh Le
(74) *Attorney, Agent, or Firm* — DANA LEGAL SERVICES; Jubin Dana

(57) ABSTRACT

Natural language grammars interpret expressions at the conversational human-machine interfaces of devices. Under conditions favoring engagement, as specified in a unit of conversational code, the device initiates a discussion using one or more of TTS, images, video, audio, and animation depending on the device capabilities of screen and audio output. Conversational code units specify conditions based on conversation state, mood, and privacy. Grammars provide intents that cause calls to system functions. Units can (Continued)

provide scripts for guiding the conversation. The device, or supporting server system, can provide feedback to creators of the conversational code units for analysis and machine learning.

12 Claims, 14 Drawing Sheets

(56) References Cited

U.S. PATENT DOCUMENTS

| | | | |
|---|---|---|---|
| 10,096,319 B1 | 10/2018 | Jin et al. | |
| 10,937,064 B2* | 3/2021 | Zhang | G06Q 30/0271 |
| 11,451,511 B1* | 9/2022 | Lakshmanan | H04L 61/302 |
| 2002/0032564 A1* | 3/2002 | Ehsani | G06F 40/40 |
| | | | 704/E15.04 |
| 2003/0177063 A1* | 9/2003 | Currans | G06Q 30/02 |
| | | | 705/14.67 |
| 2004/0204942 A1 | 10/2004 | Lee | |
| 2005/0091111 A1 | 4/2005 | Green et al. | |
| 2005/0223878 A1* | 10/2005 | Furuta | G10H 1/00 |
| | | | 84/609 |
| 2007/0038737 A1* | 2/2007 | Keller | H04L 67/025 |
| | | | 709/224 |
| 2008/0033724 A1* | 2/2008 | Block | G10L 15/22 |
| | | | 704/E15.04 |
| 2008/0115163 A1* | 5/2008 | Gilboa | G06Q 30/0241 |
| | | | 704/E15.045 |
| 2008/0189110 A1 | 8/2008 | Freeman et al. | |
| 2009/0245479 A1 | 10/2009 | Surendran | |
| 2009/0254971 A1* | 10/2009 | Herz | G06Q 30/0603 |
| | | | 726/1 |
| 2010/0076843 A1* | 3/2010 | Ashton | G06Q 30/06 |
| | | | 705/26.1 |
| 2010/0086107 A1 | 4/2010 | Tzruya | |
| 2010/0299142 A1* | 11/2010 | Freeman | G06Q 30/0242 |
| | | | 704/E15.001 |
| 2010/0333163 A1* | 12/2010 | Daly | H04N 5/4403 |
| | | | 725/133 |
| 2011/0145002 A1 | 6/2011 | Melamed et al. | |
| 2011/0230229 A1* | 9/2011 | Das | G06Q 30/02 |
| | | | 704/E15.001 |
| 2011/0271194 A1 | 11/2011 | Lin et al. | |
| 2011/0301968 A1* | 12/2011 | Godwin | G06Q 50/22 |
| | | | 705/2 |
| 2012/0016678 A1 | 1/2012 | Gruber et al. | |
| 2012/0072204 A1* | 3/2012 | Nasri | G06F 40/253 |
| | | | 704/260 |
| 2013/0018736 A1* | 1/2013 | Raichelgauz | G06Q 30/0277 |
| | | | 705/14.73 |
| 2013/0332284 A1* | 12/2013 | Faith | G06Q 30/0225 |
| | | | 705/14.66 |
| 2014/0012577 A1 | 1/2014 | Freeman et al. | |
| 2014/0019243 A1 | 1/2014 | Cole et al. | |
| 2014/0058812 A1 | 2/2014 | Bender et al. | |
| 2014/0067395 A1 | 3/2014 | Balasubramanian et al. | |
| 2014/0195345 A1* | 7/2014 | Lyren | G06Q 30/0271 |
| | | | 705/14.67 |
| 2014/0288946 A1 | 9/2014 | Shinohara et al. | |
| 2014/0310001 A1 | 10/2014 | Kalns et al. | |
| 2015/0032551 A1* | 1/2015 | Ekambaram | G06Q 30/0271 |
| | | | 705/14.67 |
| 2015/0039307 A1* | 2/2015 | Jeon | G10L 15/22 |
| | | | 704/235 |
| 2015/0144653 A1* | 5/2015 | Kline | B67D 1/0888 |
| | | | 222/1 |
| 2015/0163561 A1 | 6/2015 | Grevers, Jr. | |
| 2015/0193829 A1* | 7/2015 | Mukherjee | G06T 11/60 |
| | | | 705/14.67 |
| 2015/0234829 A1* | 8/2015 | Yoshitake | G06Q 10/10 |
| | | | 707/723 |
| 2015/0302458 A1 | 10/2015 | Dides et al. | |
| 2015/0331666 A1 | 11/2015 | Bucsa et al. | |
| 2015/0379556 A1* | 12/2015 | Udassin | G06Q 30/0275 |
| | | | 705/14.42 |
| 2015/0379989 A1 | 12/2015 | Balasubramanian et al. | |
| 2016/0205358 A1* | 7/2016 | Dickinson | H04N 7/188 |
| | | | 348/157 |
| 2016/0253713 A1* | 9/2016 | Aarabi | G06Q 30/0276 |
| | | | 705/14.67 |
| 2016/0275760 A1* | 9/2016 | Block | G07F 19/203 |
| 2016/0295280 A1* | 10/2016 | Zavesky | H04N 21/812 |
| 2017/0018269 A1* | 1/2017 | Lev | G10L 15/19 |
| 2017/0039593 A1* | 2/2017 | Jordan | G06Q 30/0255 |
| 2017/0091612 A1 | 3/2017 | Gruber | |
| 2017/0091659 A1 | 3/2017 | Sanchez et al. | |
| 2017/0103754 A1 | 4/2017 | Higbie et al. | |
| 2017/0118336 A1* | 4/2017 | Tapuhi | G06F 16/3329 |
| 2017/0221157 A1 | 8/2017 | Allen et al. | |
| 2017/0249663 A1* | 8/2017 | Hajiyev | G06Q 30/0269 |
| 2017/0300499 A1* | 10/2017 | Lev-Tov | G06F 16/34 |
| 2018/0068339 A1* | 3/2018 | Dey | G06Q 30/0269 |
| 2018/0075483 A1* | 3/2018 | Boyarshinov | G06Q 30/0255 |
| 2018/0096617 A1* | 4/2018 | Tapuhi | G06Q 10/0639 |
| 2018/0182389 A1 | 6/2018 | Devaraj et al. | |
| 2018/0255180 A1* | 9/2018 | Goldberg | G06F 40/279 |
| 2018/0285752 A1* | 10/2018 | Yu | G06V 40/20 |
| 2018/0314959 A1* | 11/2018 | Apokatanidis | G06N 5/04 |
| 2019/0043493 A1* | 2/2019 | Mohajer | G10L 17/00 |
| 2019/0050494 A1* | 2/2019 | Rao | G06F 16/7867 |
| 2019/0139541 A1 | 5/2019 | Andersen et al. | |
| 2019/0198016 A1 | 6/2019 | McKenzie et al. | |
| 2019/0237069 A1 | 8/2019 | Zhao et al. | |
| 2020/0112760 A1 | 4/2020 | Miller et al. | |
| 2020/0219135 A1* | 7/2020 | Hahn | G06Q 30/0267 |
| 2021/0193138 A1 | 6/2021 | Yu et al. | |
| 2021/0314433 A1 | 10/2021 | Clancy | |
| 2021/0390581 A1* | 12/2021 | Chan | G06V 20/597 |
| 2022/0051291 A1* | 2/2022 | Pateel | G06F 16/24575 |
| 2022/0210101 A9* | 6/2022 | Asukai | G06Q 50/01 |

FOREIGN PATENT DOCUMENTS

| | | |
|---|---|---|
| CN | 101990678 A | 3/2011 |
| CN | 102436626 A | 5/2012 |
| CN | 113918896 A | 1/2022 |
| EP | 1884924 A1 | 2/2008 |
| JP | 2004234492 A | 8/2004 |
| JP | 2009524157 A | 6/2009 |
| JP | 2014109992 A | 6/2014 |
| JP | 2014222514 A | 11/2014 |
| JP | 2015508542 A | 3/2015 |
| JP | 2016024631 A | 2/2016 |
| JP | 2016045584 A | 4/2016 |
| JP | 2016045584 A1 | 4/2016 |
| JP | 2017507434 A | 3/2017 |
| JP | 2017-220077 A | 12/2017 |
| KR | 10-2009-0072599 A | 7/2009 |
| KR | 10-2013-0112221 A | 10/2013 |
| KR | 2013-112221 A1 | 10/2013 |
| KR | 20130112221 A | 10/2013 |
| KR | 10-2016-0023935 A | 3/2016 |
| KR | 10-2017-0027705 A | 3/2017 |
| WO | 02/089113 A1 | 11/2002 |
| WO | 2007089967 A2 | 8/2007 |
| WO | 2011088053 A1 | 7/2011 |
| WO | 2013106477 A1 | 7/2013 |
| WO | 2015135841 A1 | 9/2015 |
| WO | 2019125486 A1 | 6/2019 |

OTHER PUBLICATIONS

Doe, Chris and Masse, Benjamin, Digital Audio Ad Serving Template (DAAST), Working Group Report, Dec. 4, 2015, pp. 1-65, Version 1.1 Draft, IAB Audio Committee, New York City, New York.

Shetty, Amit, Digital Video In-Stream Ad Format Guidelines, Working Group Report, Jan. 8, 2016, pp. 1-23, 2016 Report, IAB Technology Lab, New York City, New York.

(56) References Cited

OTHER PUBLICATIONS

Monetize your products with Voice Activated Ads, On-Line Advertisement, 2017, pp. 1-9, © Instreamatic, SanFrancisco, California.
Myers, Michael, Custom Actions For Mobile Audio Ad Conversion, On-Line Article, Aug. 26, 2014, pp. 1-2, XAPPmedia, Washington, D.C.
Wong, Katherine, The Weather Company and Toyota Drive First Cognitive Ads for Auto Industry, Press Release, Jun. 15, 2017, pp. 1-3, The Weather Company, Atlanta, Georgia.
Written Opinion of the International Search Authority, dated Sep. 28, 2018.
European Searach Report—Reference P120711EP, Application No. 18 214 971.6-1231 dated May 10, 2019.

* cited by examiner

SYSTEM AND METHOD FOR ADAPTED INTERACTIVE EXPERIENCES

FIELD OF THE INVENTION

The present invention is in the field speech-based conversational human-machine interfaces using natural language grammars (class 704/E17.015 or 704/251).

BACKGROUND

Before becoming the head of RCA™ and founder of NBC™, David Sarnoff, an early pioneer in radio and television broadcast technology, once said, "The radio music box has no imaginable commercial value. Who would pay for a message sent to nobody in particular?". At that time, he had not yet recognized the forthcoming giant industry of transmitting commercial messages through telecommunications systems and networks.

Visual messages had been in printed publications for almost as long as publications had been printed. Eventually, to Mr. Sarnoff's doubtless surprise, it became routine to broadcast audio messages several times per hour, within other radio broadcast content. Television broadcasters, similarly, adopted the approach of broadcasting video messages several times per hour within television broadcast content. Naturally, the advent of internet-connected computers, mobile handsets, tablets, music players, virtual reality, and other such devices brought about visual, video, and audio messaging through those devices, interspersed with other content desired by their users.

Whether in the medium of print, radio, television, or internet-connected devices, targeted messaging has consisted of: sources competing for message opportunities by providing messages and offers; publishers accepting the highest offers and delivering the associated messages, amid their desirable content, to prospective consumers of the sources' goods or services (users); and, hopefully, converting the users into value-returning consumers of the source.

SUMMARY OF THE INVENTION

Today, most messages are not interactive. Some are static images, some are audio messages, some are video. Much research has gone into accurately targeting users with non-interactive messages. The greatest extent of interactivity in conventional messaging is the ability to click one or a small number of buttons within visual messages to see small amounts of specific additional information or to play games.

The present disclosure is directed to systems and methods of: defining experience units that support conversational natural language interactions with users; delivering messages; competing for message opportunities; providing information from users to publishers and from publishers to sources; performing machine learning from user interactions; and related aspects of the message delivery ecosystem.

By using certain embodiments, conversions can be accurately and meaningfully attributed to the acquisition channel. Conversion rates are higher and more measurable, and targeting is more influential and more precise.

Delivering natural language interactive messages from the interfaces of trusted machines is an ultimate form of product placement, where the published content is the behavior of the machine and the product is placed there amid.

DETAILED DESCRIPTION

Figure 1:
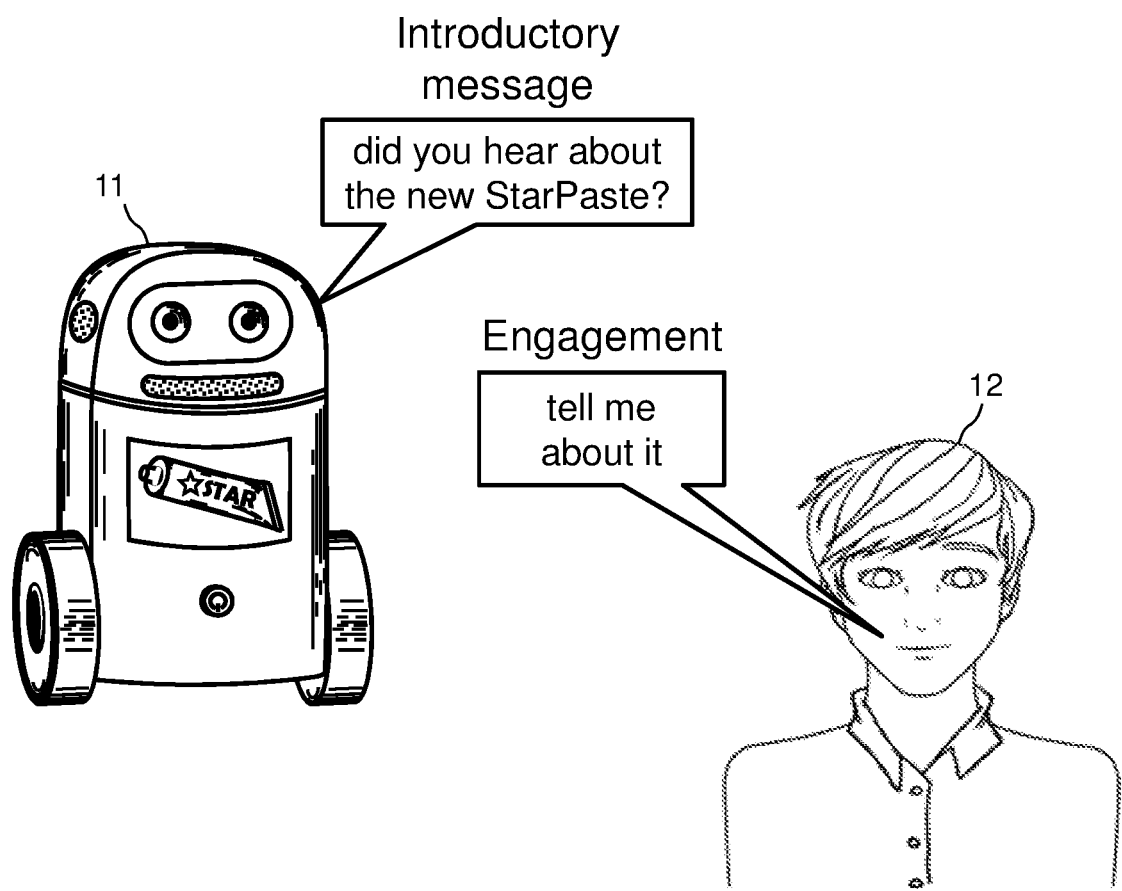
FIG. 1 illustrates engagement between a conversational robot device and a user, according to an embodiment.

According to various embodiments, natural language expressions can be human expressions of one or more tokens of information, such as by speech or other means such as typing, tapping, gesturing, or direct cognitive coupling. Natural language grammars can be one or more intents, each with a set of possible expressions that map to it. Domains can be sets of grammars specific to a topic of conversation or data set. Intents can be data structures that represent a human's hypothesized desired action expressed by a natural language expression. Some examples of actions are retrieving information and responding to a query, sending a message, performing a motion, or making a software development kit (SDK) function call to a web application programming interface (API) for performing any desired action. Interpreting can be the process of deriving an intent from a token sequence or token sequence hypothesis.

According to some embodiments, sources are entities who define experience units and pay for them to be delivered to users. Experience units comprise content, an offer, and one or more natural language grammars. According to some embodiments, messages begin by delivering an introductory message defined as content within an interactive experience unit. The introductory message is content intended to initiate a specific human-machine interaction. Some introductory messages are as short as a single phrase. Content, according to various embodiments, can be one or more of images, video, audio clips, spoken words, and so forth, wherein the content has meaning to users. Some introductory messages are as long as conventional commercial messages. Some embodiments present an introductory message to initiate a new conversation. Some embodiments work an introductory message into a conversation as part of a machine's conversation turn, such as responding to a request for ingredients of a cooking recipe with a specific name of a brand of the ingredient.

According to some embodiments, publishers are entities that deliver messages to users and are compensates for doing so. Generally, they deliver such messages amid other content that users desire, expect, or request. In some embodiments, a publisher uses a server to control or serve content for one or more remote devices. In some embodiments, a device alone performs the publisher function. In some embodiments, a publisher works with one or more intermediaries to receive or determine what messages to deliver to users. In some embodiments, a publisher receives information from or about a user of the device that delivers messages. Some examples of device embodiments are anthropomorphic robots, household appliances, household assistant devices, wearable electronic devices, mobile phones, desktop computers, automobiles, billboards, kiosks, vending machines, and other such devices with human-machine interfaces.

According to some embodiments, after finishing delivering or after starting delivery the introductory message, publishers proceed to identify a natural language expression, provided by a user, indicating an engagement. Such embodiments interpret the natural language expression according to a natural language grammar defined within the interactive experience unit. In response to the interpretation finding that the natural language expression matches the grammar, such embodiments are able to determine that an engagement has occurred.

Examples of expressions that some embodiments can process are conversation-launching engagements questions such as:
"tell me more [about that ad|product]"
"what was that [ad]",
personal assistant engagements such as:
"email me a link"
"remind me about this [tonight, tomorrow]",
generic retail questions engagements such as:
"show [it to] me"
"where can I buy it"
"[how much|what] does it cost"
"buy it [online] [now]",
product-specific engagement questions such as:
"how many rolls is that"
"what colors does it come in"
"how much does it weigh",
or other question engagements without prepared responses.

Some embodiments use intermediaries, which are entities that facilitate the delivery of experience units to opportunities, such as by performing one or more of: connecting sources to publishers; aggregating experience units; aggregating opportunities; analyzing offers based on user attributes, context, conversation state, mood, etc.; setting rates according to supply and offers; and providing information to sources about user engagement and conversion. The manner of engagement varies between embodiments. According to embodiments using voice-enabled, conversational devices, an engagement is a spoken response interpreted by an experience unit grammar.

Various embodiments use various modes and means of natural language interaction. Some are verbal, using text-to-speech (TTS) for a machine to output speech audio and automatic speech recognition (ASR) for the machine to recognize human speech audio. Such embodiments provide an audio experience. Some embodiments use music, sound effects, or other audio information to provide an audio experience. Some embodiments perform interactions using modes of text input and output, including displaying or transmitting text. Some embodiments use other neural sensing and stimulation modes of natural language based human-machine interaction.

Some embodiments use a visual display instead of or in addition to means of audible machine output such as speakers and some use text entry means such as keyboards or touchscreens, instead of or in addition to ASR of audio signals captured from microphones or other air pressure wave sensing devices.

Messages spoken by a machine can be more convincing if delivered in the voice that users are conditioned to expect from the machine. Some embodiments that deliver messages using TTS to generate speech audio output do so richly by accepting text with metadata, such as in a markup language such as Speech Synthesis Markup Language (SSML). This provides for, while using the machine's voice, setting the tone and placing emphasis on certain words, as is useful for attracting and persuading users.

Many people find it easier to specify their intent with successive small increments of information needed to fully realize the intent. Modal dialogs can facilitate such interactions. A modal dialog can be a sequence of human-machine interactions in which a machine interacts with its user in turns to prompt the user to provide information or take an action that somebody desires. For example, to produce an intent for sending a text message, a machine might successively ask its user to provide the name of the recipient, then the message. For another example, to calculate a monthly mortgage cost a machine might successively ask its user to provide: the home value, the percent of down payment, the interest rate, the loan term, and other information. It could frustrate some users if another interaction interrupts their modal dialog. Some embodiments only deliver an introductory message when a conversational interface is not engaged in a modal dialog. Some embodiments, upon realizing an opportunity to deliver an introductory message do so immediately after completion of a modal dialog.

Some embodiments, even outside of modal dialogs, can interrupt an original activity, initiate engagement, and require a response before continuing the original activity. For example, while using a machine capability of playing a game, some embodiments interrupt the game to deliver an introductory message in a casual style. Some such embodiments have a timeout, after which, if there has been no user engagement, the original activity resumes.

Various embodiments benefit sources by giving precise control over when messages are delivered so that they are more effective. Some embodiments delivery some messages not immediately, but at a time that the conversation indicates would be useful. For example, a machine conversation about the weather, if the weather will be rainy, causes the machine to deliver a message about umbrellas only at a time that the user is preparing to go outside.

According to some embodiments, there are multiple conditions for ending a conversation. A timeout at the end of a period of no voice activity can indicate an end to the conversation. According to some embodiments, a timeout period is 5 seconds, though shorter or longer periods are appropriate for different embodiments. In some embodiments, if a machine's turn in the conversation ended with a question, the timeout is longer than if the machine turn ended with a statement. Some embodiments, to avoid performing false speech recognition of background babble, require a user to use a wake phrase, such as "okay robot", to provide a response.

According to some embodiments, an indication of a lack of interest ends a conversation. For example, an expression from a user that has a high score in a domain grammar other than the experience unit grammar can indicate a lack of interest in the message. Some embodiments store in conversation state the fact that a conversation is in progress and, accordingly, give higher weight to experience unit grammars when computing scores relative to other domain grammars.

According to some embodiments, conversion ends a conversation. Experience units can define what constitutes conversion. For example, a request in a navigation domain to a store selling an item can be a conversion, a request to order a product or service online can be a conversion, and a request for a future follow-up can be a conversion. Some embodiments allow an experience unit to maintain a conversational engagement indefinitely, such as with dynamic small talk, if a user responds accordingly. In some such embodiments, a user ends the conversation by allowing the system to timeout or by making an expression that scores sufficiently highly in a domain other than the experience unit grammar. Some embodiments can use a click of a button on a screen to initiate responses.

Some embodiments consider experience units as domains. Many experience units can be simultaneously present for the natural language interpreter and compete with each other and domains not related to experience units for the highest interpretation score in response to each of a user's expressions. Some such embodiments allow grammar expressions to give dynamic weights to different possible phrasings of intents.

Some embodiments use grammar-based interpreters. Some embodiments use purely statistical language model based interpreters.

A benefit of some embodiments of conversational messages is that they provide at least as much improvement in effectiveness for audio messages for people who are visually disabled and people who are visually otherwise engaged, such as by driving cars or piloting helicopters or space drones.

FIG. 1 shows a scenario of engagement. An anthropomorphic robot assistant natural language conversational publishing device 11, having an experience unit, provides an introductory message using built-in TTS software saying, "did you hear about the new StarPaste?". A human user 12 hears the introductory message and engages by saying, "tell me about it".

Figure 2:
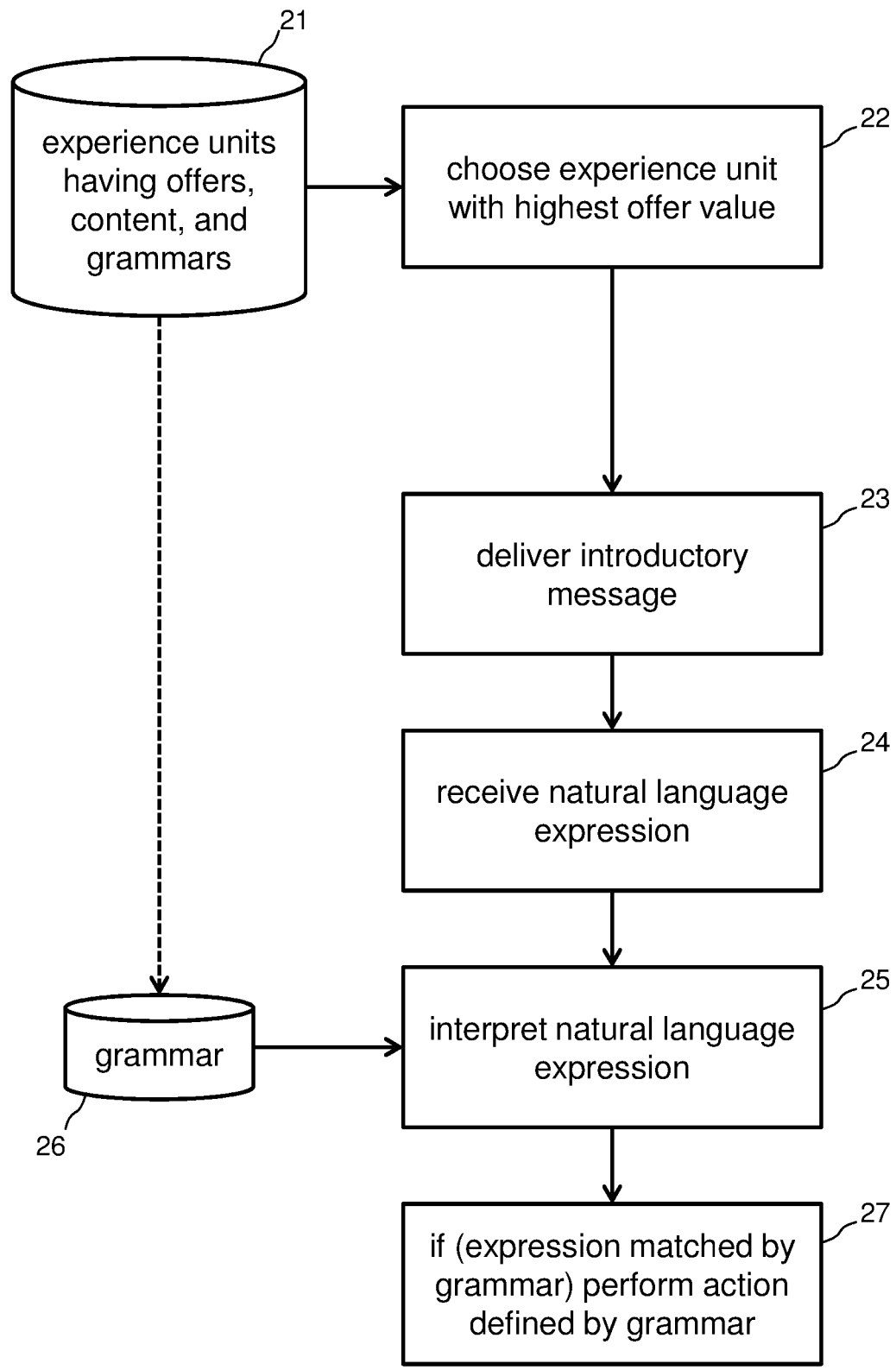
FIG. 2 illustrates a flow chart of a method of providing experiences, according to an embodiment.

FIG. 2 shows a flowchart of the operation of delivering an interactive experience. A system comprises a database 21 of experience units, each having offers, content, and grammars. The process begins in step 22 by evaluating the offers of the experience units in database 21 and choosing the experience unit with the highest offer value. In some embodiments, the evaluation of offers happens offline, well prior to delivery of experience units. In some embodiments, offer evaluation happens in real time. The process continues in step 23 to deliver the introductory message of experience unit chosen for its highest offer value. In step 24, after delivering the introductory message, the system receives a natural language expression from a user. The system proceeds in step 25 to interpret the natural language expression according to the grammar 26 from the experience unit chosen for its highest offer. If the expression matches the grammar 26, the process proceeds to step 27 in which the system performs the action indicated by the intent of the grammar 26 matched by the expression.

Conversation State

Messages are most effective when they are most relevant to what is in a user's mind at the time the message is delivered. There is no better case of relevance than for a message to be delivered when its content matches a user's immediate situation or immediate topic of conversation. These are the best indicators available today of what is in a user's mind at any moment.

Some embodiments allow the introductory message of an experience unit to comprise content conditioned by context such as time, location, user profile, and conversation state. For example, an introductory message may begin by speaking, "good morning", "good afternoon", or "good evening" depending on the time of day. An introductory message may say the name of the nearest store that offers a product, where the name of the store varies by location, such as, "did you know that they have the new Star brand toothpaste at Wal-Mart™?" or, "did you know that they have the new Star brand toothpaste at Carrefour™?". An introductory message may say the name of the user based on a user profile. For example, "hey, Maria, did you hear about the new Star brand toothpaste?" or, "hey, Mario, did you hear about the new Star brand toothpaste?". An introductory message may refer to specific entities within the state of a recent conversation such as, after requesting the score of the Eagles game, "before you go to the next Eagles game you should try the new Star brand toothpaste", or when buying a new outfit "before you go to tomorrow's party, you should try the new Star brand toothpaste".

Some embodiments that support conditional introductory message content allow the specification of the condition based on a range, such as, if the weather forecast is for temperatures between 20 and 30 degrees Celsius (68 and 86 Fahrenheit) the message is, "check out the new Star Wear styles of activewear", if the temperature forecast is greater than 30 degrees Celsius (86 Fahrenheit) the message is, "check out the new Star Wear swimsuit lineup", and if the temperature forecast is less than 20 degrees Celsius (68 degrees Fahrenheit) the message is, "check out the new Star Wear down parka collection".

Some embodiments support message offer rates being conditional based on conversation state. Some embodiments support conditioning according to thresholds, and some support conditioning according to ranges. Some embodiments support message offer rate being conditional based on context other than conversation state.

In some embodiments, conversation state is a data structure that stores grammar-relevant variables and values. Some embodiments drop conversation state variables after a certain number of conversational dialog turns. Some embodiments include time stamps in conversation state and drop conversation state variables after a certain amount of time. Some embodiments use different numbers of dialog turns or amounts of time depending on the kind of variable or its value.

Some embodiments include one or more sentiment values associated with various expressions stored in conversation state. Some embodiments maintain a current mood variable representing the mood in the environment of the human-machine interface.

Some embodiments save the conversation state when initiating an experience and then, after ending a conversation, reinstate the conversation state from before it delivered the experience.

Some embodiments maintain conversation state variables on a server. Some embodiments maintain conversation state variables on a client device. Some embodiments transfer conversation state with each human expression and machine response sent between clients and servers.

Some embodiments share conversation state between different apps or different devices in order to provide a seamless experience for a user interacting with a single virtual agent through multiple devices.

Figure 3:
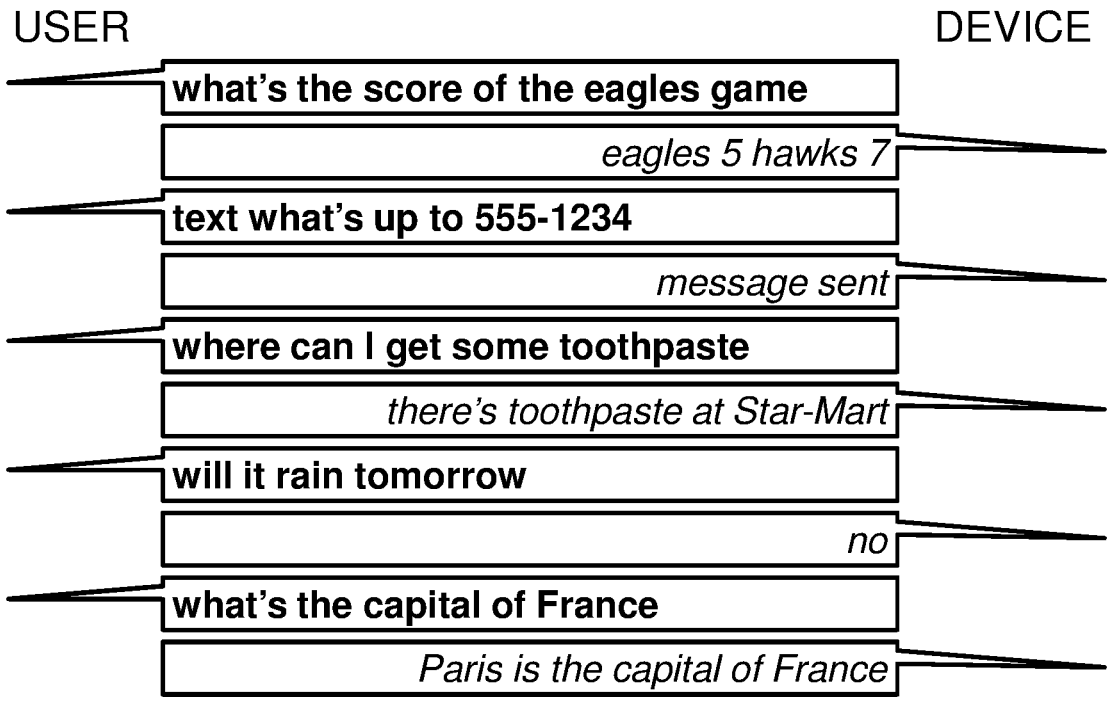
FIG. 3 illustrates a human-machine dialog with conversation state and offers based on conversation state, according to an embodiment.
Figure 3:
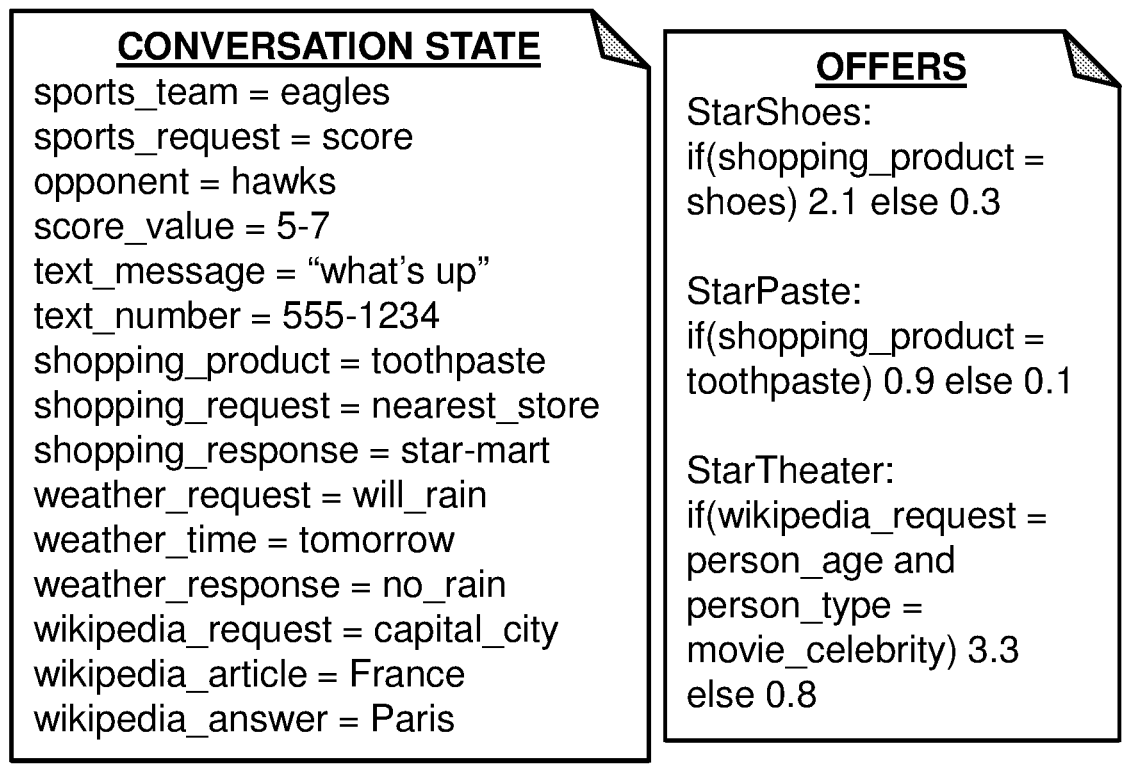

FIG. 3 shows an example dialog between a user on the left and a conversational device on the right. First, the user asks, "what's the score of the eagles game". The device performs speech recognition and natural language interpretation according to a large array of domain grammars, some local and some on a remote server. The device recognizes "Eagles" as the name of a sports team, and, based on that and the fact that the query uses the word "score", interprets the query as one about sports. The device sends a request to a web API of a provider of live sports information, which identifies that the Eagles are currently in an active game against the Hawks. The provider responds through the API to the device that the score is "5-7". The device gives a spoken natural language response to the user, "eagles 5 hawks 7".

Next, the user instructs the device, "text what's up to 555-1234". The device interprets the expression, realizing a high score in an SMS domain. The device uses a call to an SMS web API provider and parses the expression to determine that "what's up" is the message of the text and "555-1234" is the phone number to which the text should be sent. The web API provides a confirmation response to the device, which provides a natural language response "message sent" to the user.

The user proceeds to ask, "where can I get some toothpaste". The device interprets this as highly scoring in a shopping domain, reads the location from a geolocation service software function, and sends the location information to a provider of maps indicating geolocations of retail establishments. The device proceeds to access APIs for successively farther retail establishments from the device geolocation until finding one, in this case, Star-Mart, which responds positively that it has toothpaste in stock. The device proceeds to provide the natural language response, "there's toothpaste at Star-Mart".

Next, the user asks, "will it rain tomorrow". The device interprets this as highly scoring in a weather domain, accesses a weather information provider API to get the local weather forecast, and replies, "no". The user proceeds to ask, "what's the capital of France". The device interprets this as a question for Wikipedia, sends a request to the Wikipedia API for the Capital city information in the Wikipedia article on France, and gets a response, "Paris". The device provides the natural language response, "Paris is the capital of France".

During the conversation, the device builds an array of conversation state variables and values. As a result of the first query, the system adds to conversation state a variable sports_team with value eagles and a variable sports_request with value score. That is the information that the system uses to access the sports web API to get a response. The response comprises two pieces of information that the device stores in conversation state. Specifically, a variable opponent with value hawks and a variable score_value with value 5-7. As a result of the second interaction, the device adds to conversation state variables text_message="what's up" and text_number=555-1234. The third interaction causes the device to store shopping_product=toothpaste, shopping_request=nearest_store, and shopping_response=star-mart. The fourth interaction causes the device to add to conversation state weather_request=will_rain, weather_time=tomorrow, and weather_response=no_rain. The fifth interaction causes the device to add to conversation state wikipedia_request=capital_city, wikipedia_article=France, and wikipedia_answer=Paris.

The device also maintains an array of offer value functions for various experience units. The array includes three offer value functions, one for each of an experience unit for StarShoes, and experience unit for StarPaste, and an experience unit for StarTheater. The message rate functions describe an amount offered for delivering the experience unit. Some embodiments accept offers for 1000 deliveries of an experience unit. Some embodiments support, and tend to process, more complex message rate functions than shown in FIG. 3.

Though the conversation state includes a variable shopping_product, because it is not=shoes, the StarShoes message rate is 0.3. Because conversation state includes a shopping_product variable and its value is toothpaste, the StarPaste message rate 0.9. Although conversation state includes a wikipedia_request variable, because its value is not person_age, the StarTheater message rate is 0.8. Therefore, StarPaste is the experience unit with the highest offer function value.

After a certain period of silence, the device delivers the introductory message of the StarPaste experience unit. The introductory message is TTS generated natural language speech saying, "did you know that StarPaste is on sale at Star-Mart for just 2 bitcoins?". This invites the user to engage with the experience.

Figure 4:
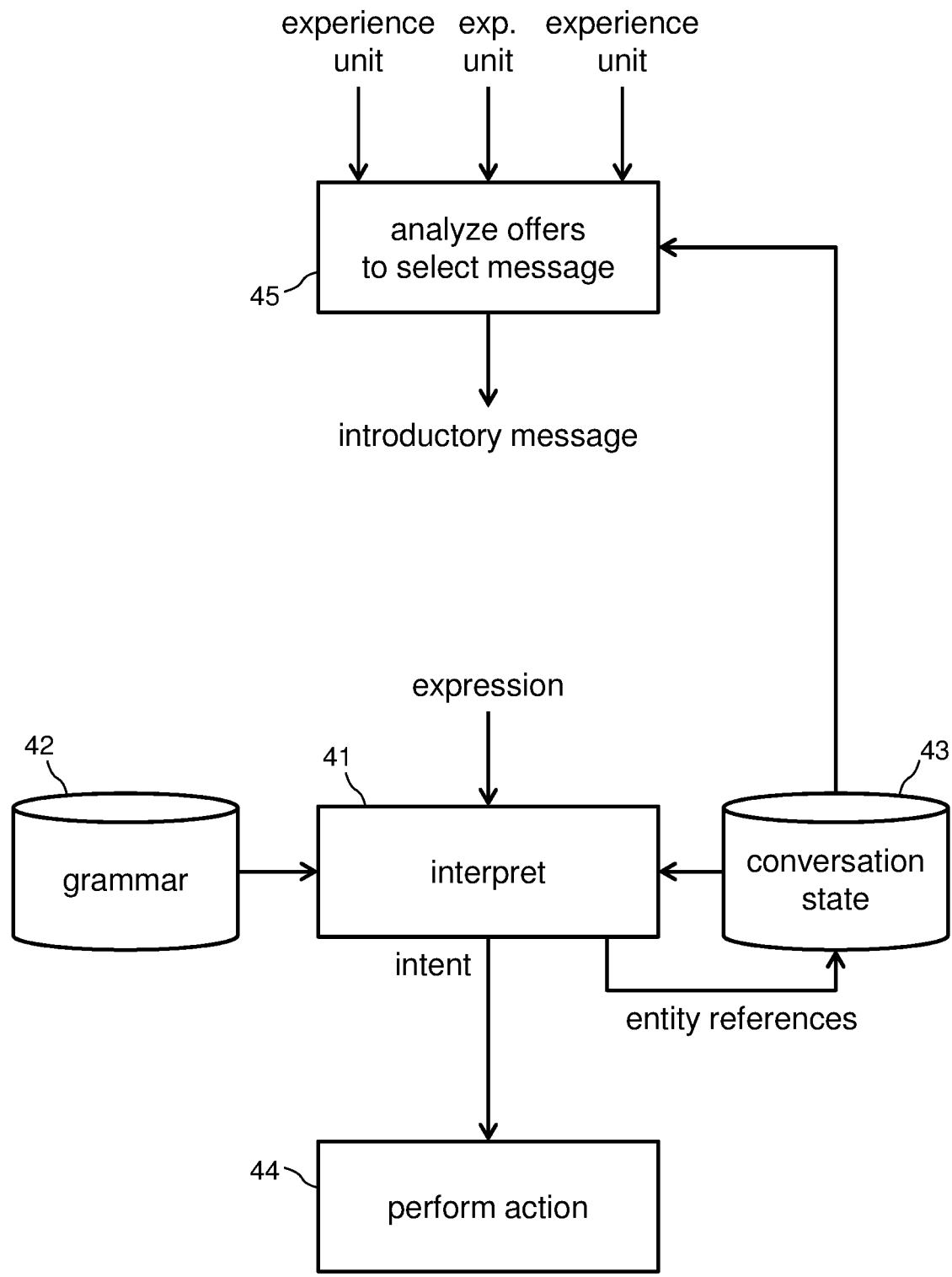
FIG. 4 illustrates interpreting expression in the context of conversation state also used for analyzing offers, according to an embodiment.

FIG. 4 shows a process according to an embodiment. In a stage 41, a publisher receives and interprets expressions according to a grammar 42 and array of conversation state variable 43. Accordingly, the publisher produces an intent. In stage 44 the publisher performs an action specified by the intent. The interpretation stage also produces references to specific entities, which the publisher stores in the array of conversation state variables 43. Meanwhile, a stage 45 receives a multiplicity of experience units. It analyzes the offers of the experience units in the context of the conversation state 43. Accordingly, the analyzing stage 45 chooses a highest valued experience unit and outputs its introductory message. The purpose is to engage a user such that the user makes an expression that matches the experience unit's grammar.

Mood

Users, when encountering messages, assign mental feelings to described products or services according to the users' feeling at the time of encountering the message. The best instantaneous gauge of a user's current feeling is emotion detection. Many emotion detection algorithms exist that use natural language, speech prosody, camera input, and other forms of sensors and algorithms to estimate people's emotions. Whereas emotion is a property of a person, mood is an ambient property of interaction between people or between people and machines.

Some embodiments detect a mood and deliver experience unit introductory messages conditionally based on the mood. Some embodiments support experience content, such as the introductory message content, being conditioned by the mood. Some embodiments support message rates being conditioned by mood. Some embodiments support conditioning according to thresholds, and some support conditioning according to continuous values. Some embodiments reevaluate the mood frequently, and some embodiments reevaluate the mood at occasional intervals.

Using mood to condition delivery of messages allows sources to control mental feelings that users assign to described products and services.

Scripted Conversations

The conversational messages of some embodiments guide users through a script. In some embodiments, scripts can have multiple conditional conversation paths, and the machine offers explicit choices. For example, the machine might ask, "would you like to know more about the health benefits, the flavor, or the brightness of StarPaste?"

Whereas a purpose of an introductory message is to achieve an engagement, a script can encourage users to convert the engagement into a purchase. Different users have different interests. By analyzing their natural language interactions, a scripted experience unit can classify the user. By classifying the user, the script is able to provide information that most effectively encourages the user to convert.

In some embodiments, the machine uses information gleaned from user responses to profile the instantaneous state of the user's thoughts and feelings. For example, if the user speaks more quickly and loudly than usual, the experience might provide calming words. For another example, if the conversation state indicates recent discussion of health, the experience might provide information about a healing and wellness.

It can be useful to sources and intermediaries to know how a user engages with an experience. Some embodiments send feedback from the human-machine interface to the publisher, intermediary, or source at each step in the dialog script. In some embodiments, the feedback indicates the script location. In some embodiments, the feedback includes transcripts or audio recordings of the captured user expressions. Some embodiments include personally identifying information. Some embodiments demand more in exchange from sources or intermediaries for extra information.

Figure 5:
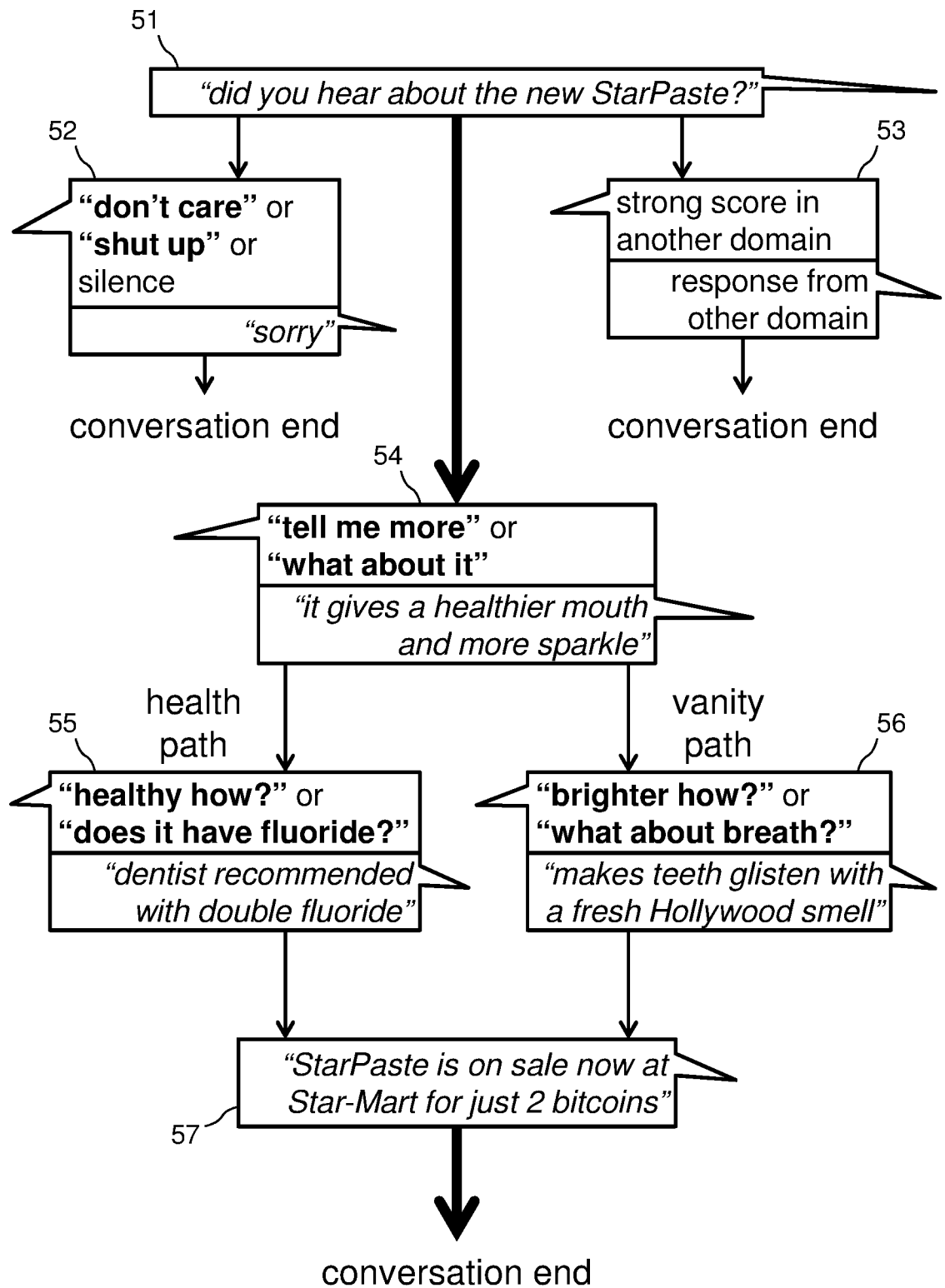
FIG. 5 illustrates a dialog script, according to an embodiment.

FIG. 5 shows an embodiment of a script. It begins with an introductory message 51 telling the user, "did you hear about the new StarPaste?". The interface proceeds to wait for a recognized expression from a user and match any received expression to an experience unit grammar. If an expression matches a grammar showing disinterest, such as including a phrase, "don't care", "shut up", or silence, the script replies with "sorry", ends the conversation, and the interface device sends feedback to that effect to the source.

If, after the introductory message 51, a user's expression matches with a strong score in a domain other than the message 53, the script ends the conversation, the interface sends feedback to that effect to the source, and the interface proceeds with a conversation in the other domain.

If, after the introductory message 51, a user's expression matches a grammar indicating engagement 54, such as "tell me more" or "what about it", the script proceeds to offer a follow-up content item, which is a message, "it gives a healthier mouth and more sparkle". The script calls for classifying the user as one who has a greater interest in health than vanity or the other way around. The message includes information ("healthier mouth") that appeals to health-concerned users or information ("more sparkle") that appeals to vanity-concerned users.

If a next user expression matches a grammar related to health, such as by saying, "healthy how?" or "does it have fluoride?" in path 55 the script replies with a message to entice health-concerned users to move forward. The message is, "dentist recommended with double fluoride". If a next user expression accesses a grammar related to vanity, such as by saying, "brighter how?" or "what about breath?" in path 56 the script replies with a message to entice vanity-concerned users to move forward. The message is, "number 1 in Hollywood for shiny fresh breath".

After taking path 55 or path 56 the script proceeds to encourage the user to convert to a purchase with message 57 saying, "StarPaste is on sale now at Star-Mart for just 2 bitcoins". At this point, the script ends the conversation and the interface sends corresponding feedback to the source.

Some embodiments support, and some experience units define much more complex scripts with many conditional paths, multiple dimensions of user classification, and conditional, personalized message content.

Privacy

Some embodiments can deliver messages that would embarrass or shame a user if other people heard or saw the experience unit's introductory message. For example, some messages may be for gifts for surprise parties, some messages may be for products that treat private medical conditions, and some messages may be for services that serve prurient interests.

Some embodiments allow for messages, or message offers, to be conditioned by the presence of people other than the target user. Some embodiments do so with cameras and image processing to detect people. Some embodiments use audio voice discriminating algorithms to detect whether multiple speakers are present. Some embodiments detect the radio signal emissions from personal portable electronic devices such as Bluetooth, Wi-Fi, or cellular network signals from mobile phones.

Some embodiments that perform detection of the presence of others lower a privacy level variable when other people are present. Some such embodiments detect attributes of people present, such as using image processing or voice characterization to determine whether male or female people or adults or children are present.

Some embodiments raise a privacy level variable when the natural language human-machine interface is through a personal interface, such as a headphone, wearable device, or personal mobile handset.

Some embodiments parsing message offer code to detect a privacy level requirement associated with the message. They only allow the message to be displayed, and in some embodiments only consider the message in the offer comparison, if the current privacy level is at or above the level defined in the message offer code.

Intents and Actions

Natural language understanding systems interpret expressions to determine intents. Intents are data structures that can represent actions that the speaker wishes a machine to perform. In some embodiments, interpreting is according to context-free grammar rules, such as ones created by system designers. In some embodiments, interpreting is by application of statistical language models to the words expressed. This can be done in various ways, such as by using trained neural networks.

According to some embodiments, interactive natural language messages comprise grammars with rules that define specific intents according to words expressed by users. For example, a grammar may recognize the words "tell me more" as an intent of requesting additional information, which means requesting the interface to perform an action of delivering more information about the product or service described by the message. A grammar may recognize the words "shut up" as an intent requesting the action of ending the experience. A grammar for a mobile phone message may recognize the words "how's its battery life" as a request for specific information about the battery capacity and power consumption of the phone. A grammar may recognize the words "get it" as an intent requesting an action of ordering the described product or service Many means can be used for executing actions defined by intents of natural language grammars. For example, a text message sending function provides means of sending text messages. An order placement function provides means of ordering the delivery of a described product or service. A mapping function provides means for giving users directions to a place for purchasing the described goods or services. A browser provides means of presenting web content, such as hypertext markup language (HTML) and cascading style sheet (CSS), about the described goods or services. A browser also provides means for executing certain kinds of scripts, such as ones written in the JavaScript language. Such scripts can cause computers to perform any action of which they are capable. An autonomous vehicle provides a means for transporting a user to a location to purchase the described goods or services. Various means for executing actions indicated by intents, as appropriate for different applications of embodiments, will be apparent to ordinarily skilled artisans.

Various embodiments, to the extent that they are able, execute the action indicated by the intent. Some embodiments, if unable to carry out the intended action reply to the user, to the source, or both that it is unable.

Offer Competition

According to some embodiments, opportunities are the message space/time that a publisher has available to sell. Many methods are known for rate setting on available opportunities.

Figure 6:
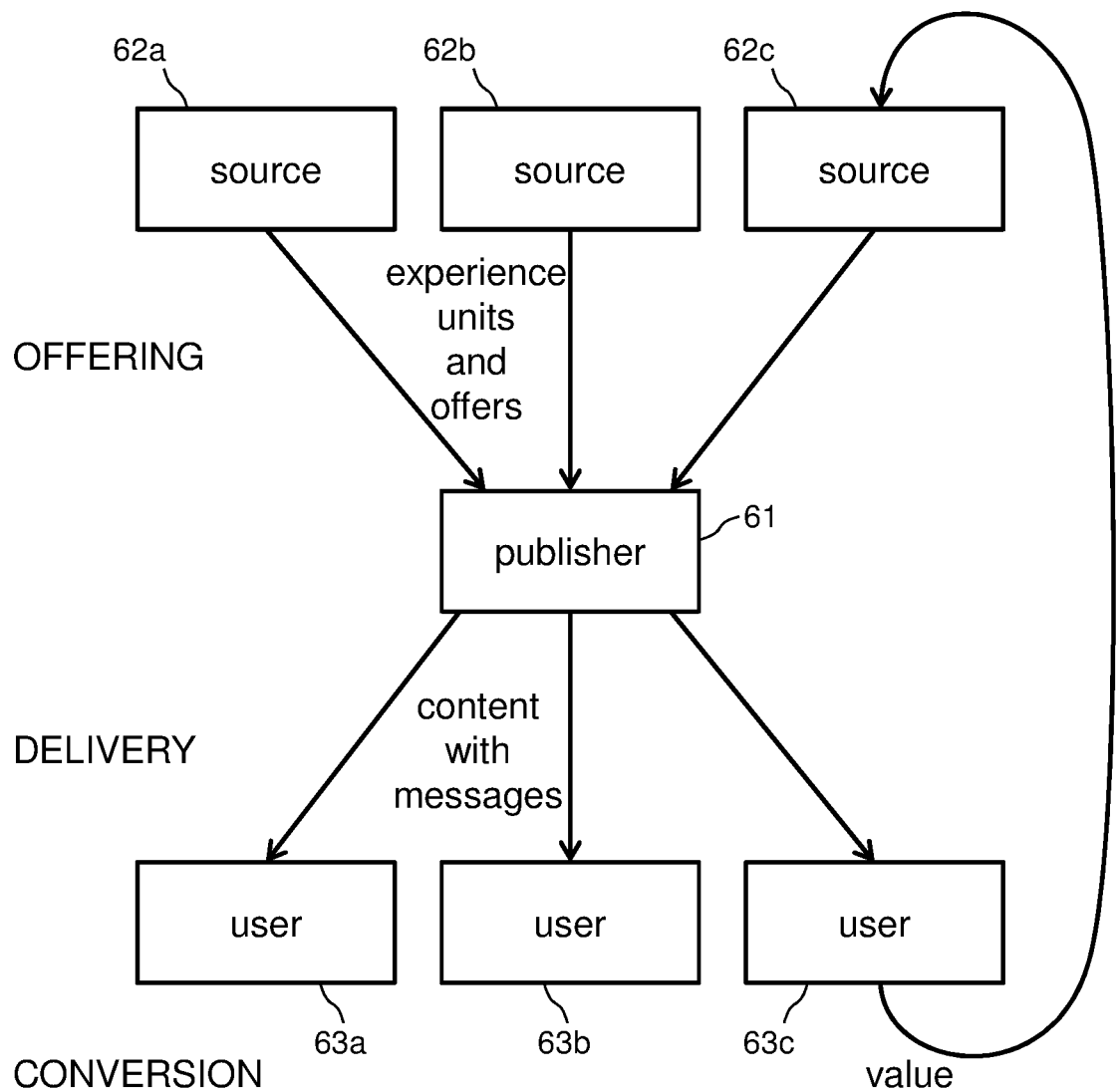
FIG. 6 illustrates sources competing for a publisher to deliver their messages to users, according to an embodiment.

FIG. 6 shows an embodiment in which sources 62a, 62b, 62c provide experience units, comprising offers to a publisher 61. The publisher provides desirable content along with messages to users 63a, 63b, 63c. Hopefully, conversion happens and users provide value for goods or services from the source.

Figure 7:
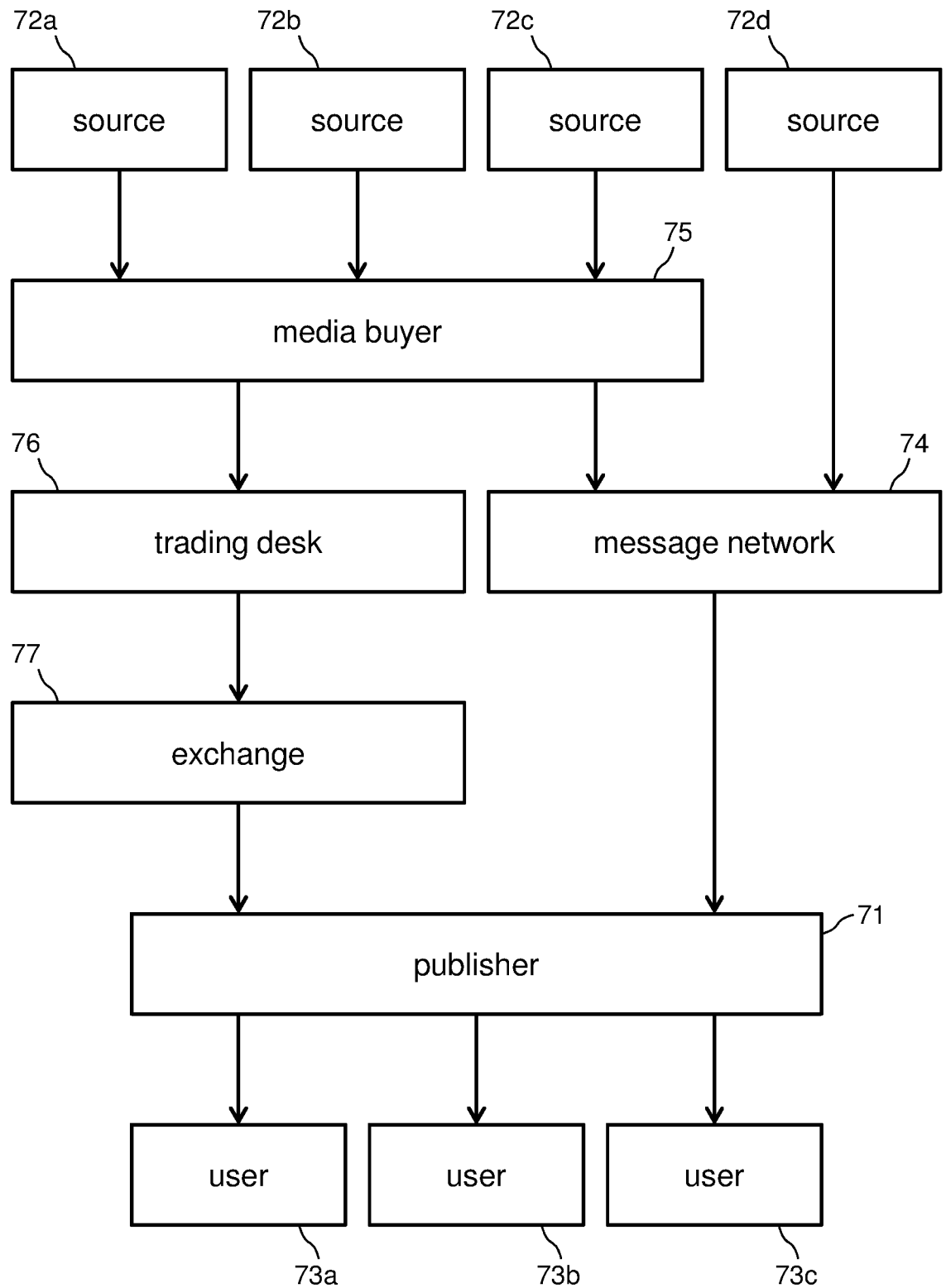
FIG. 7 illustrates the flow of messages from sources to users through a message delivery ecosystem, according to an embodiment.

Systems for competing can include numerous intermediaries and types of intermediaries between sources and publishers. FIG. 7 shows a system in which sources 72a, 72b, 72c provide experience units to a media buyer 75, who aggregates and packages experience units for distribution to multiple publishers and negotiates rates. Typical media buyers are large agencies. The media buyer 75 provides experience units to a trading desk 76, which set rates on an exchange 77. Large agencies tend to have trading desks. Exchange 77 matches experience unit offers with opportunities and makes a market with programmatic rate setting. AppNexus™ is an example of an exchange. In an alternate path, another source 72d and the media buyer 75 provide experience units to a message network 74. Google™ AdWords™ is an example of a message network. The message network facilitates automatic placement of messages within available opportunities. A publisher 71 offers opportunities on the exchange 77 and the message network 74 to deliver to users 73a, 73b, 73c.

Some message exchanges implement programmatic rate setting, which provides high liquidity in the message market. Programmatic competing in various embodiments depends on user profile, present location, location history, present activity, time of day, time of week, time of year, types of messages recently delivered, types of information in conversation state, specific values of information in conversation state, mood, feelings, and neural activity patterns.

According to some embodiments, a publisher maintains conversation state for a conversational human-machine interface. The publisher analyzes offers for messages in relation to the conversational human-machine interface. The offers indicate interesting values of conversation state variables and are influenced by at least one current conversation state variable having the interesting conversation state variable value.

Some embodiments support offers based on the presence of keywords in conversation state. Some embodiments support offers based on the presence of a particular domain of conversation in conversation state. For example, weather is a domain and sports is another domain. Some embodiments support offers based on the presence of a particular variable within conversation state. For example, sports_team is a variable. Some embodiments support offers based on specific values of variables. For example, "eagles" can be a value of the variable sports_team. Some embodiments support offers based on sets of possible values of variables, such as "eagles", "hawks", and "falcons" as values of a variable sports_teams. Some embodiments support offers based on ranges of values of numeric variables, such as a temperature variable with a value between 20 and 30 degrees Celsius (68 to 86 Fahrenheit). Some embodiments support offers based on combinations of the above criteria. Some embodiment support specifying offers as programmatic equations of any of the presence of types of variables, specific values, sets of values, and ranges. Such equations determine a degree of match between an offer and conversation state. Equations can also express negative influences on offer value based on the factors described above.

Some embodiments support offers based on mood. Such embodiments detect a current mood value at the human-machine interface and evaluate offers in the context of the mood value. Some embodiments receive an externally computed mood value and use the value to influence the computed offer value.

Some embodiments support offers conditioned by whether a user is in a private listening environment. Such embodiments detect the environment and compute offer values accordingly. Some such embodiments determine the listening environment by detecting the presence of other people.

Some embodiments perform voice activity detection at the human-machine interface and only output an introductory message when there is no voice activity. Some embodiments wait for a certain amount of time after detecting no voice activity before outputting an introductory message.

Some embodiments support offers based on a specific intent of a natural language expression. Some embodiments support offers based on a specific action triggered by one or more intents.

Some embodiments charge sources for their offers only when engagement occurs. Some embodiments charge sources only when a conversion occurs. Some embodiments charge sources based on how many interactions a user has with the experience before conversion or disengagement. Some embodiments charge sources based on what kinds of interactions a user has, such as whether or not the user makes a cost request or whether or not the user expresses a negative sentiment.

Some embodiments are methods of defining offers and methods of analyzing offers. Some embodiments are systems that perform the analysis of offers. Some embodiments are non-transitory computer readable media that store offers or offer functions.

Feedback and Analytics

Knowing the present state of mind of a user, the exact topic in mind, and the specific objects of a user's thoughts, are extremely valuable for offline analysis by sources and analytics companies. However, knowing such information in real-time is much more valuable.

It is only with difficulty, complexity, and low accuracy that feedback based on clicks can determine a user's state of mind, topic, and objects of thought. Natural language processing of a user's communications, such as by processing the content of email messages, is useful for determining state of mind, topic, and objects of thought. However, it is not real-time.

Some embodiments, by processing natural language conversations in real-time, extract extremely valuable information for message targeting. Such information is useful when applied to real-time conversation competition algorithms for conversational experience units. It is also useful to sources if fed back from human-machine interactions.

Some embodiments feed information back for real-time offers by interpreting natural language expressions from users to create intent data structures. They proceed to analyze the intent data structures to derive analytical results in real-time. Then they provide the analytical results to real-time offers of sources.

Some embodiments provide feedback, such as whether engagement or conversion happened, on a per-expression basis. Some embodiments provide feedback on a per-experience basis.

In some embodiments, the analytical results comprise an indication of an intent. Some embodiments, with the analytical results, feed back an indication of the domain of conversation prior to the engagement. Some embodiments, with the analytical results, feed back an indication of the domain of conversation immediately following the experience.

Some embodiments feed personally identifying information back to sources. Some embodiments specifically hide personally identifying information. One reason to do so is to ensure privacy of system users. Another use of personally identifying information is to sell it to sources for a higher rate than for anonymized user interaction analysis (analytics).

Some embodiments use feedback analytics about topics, intents, semantic information, mood/emotions, questions asked, engagement rate, other engagement metrics, conversion rate of messages and categories of messages, reach, deliveries, amount spent, and other conversion metrics. Analytics can include which/how many messages, of an array of competing message offers, matched a condition for experience unit delivery. This improves the ability to determine timing of delivering messages.

Proctor & Gamble™ defines the first moment of truth as the time when a user purchases a product and the second moment of truth as the time when the user first uses the product. Google™ defines the zero moment of truth as the time when a user first searches for information about a type of product. Some key query phrases indicate a zero moment of truth, such as "show me . . . " or "where can I get . . . ". Some intents derived from natural language interpretations indicate a zero moment of truth. Numerous language patterns can match grammars that create intents related to research about products or services.

Some embodiments identify message opportunities by monitoring natural language interactions at human-machine interfaces. They interpret natural language expressions to identify zero moment of truth intents. At such time, such embodiments identify a type of product or service referenced in the query or in conversation state, then upon identifying a referenced product or service, alert a message offer for the product or service and increase the rate for message delivery because of its timely relevance. Some such embodiments proceed to deliver the experience unit identified by the offer. Some such embodiments deliver an introductory message for an experience unit for the product or service. Some such embodiments proceed to receive follow-up expressions from a user and match them to a grammar.

Figure 8:
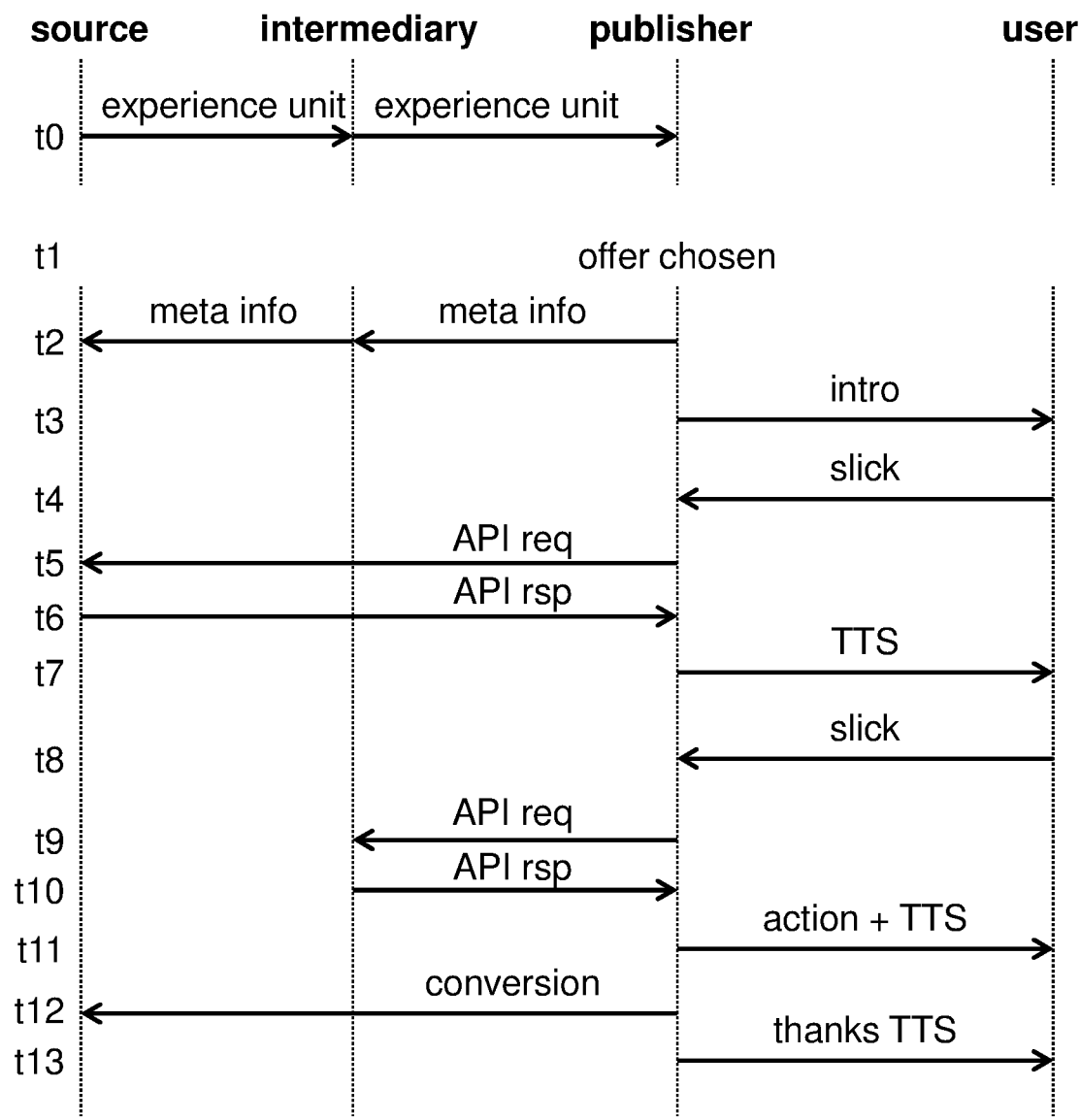
FIG. 8 illustrates interactive message delivery with actions and conversational feedback through an ecosystem, according to an embodiment.

FIG. 8 shows a timeline of information flow between a source, an intermediary, a publisher, and a user according to an experience of an embodiment. At time t0, before the conversation begins, a source provides an experience unit to an intermediary. The intermediary adjusts the value of the experience unit based on its offer value in a rate setting process.

At time t1, which can be much later than time t0, the publisher identifies the experience unit with the winning offer value. The publisher proceeds, at time t2, to provide meta information to the intermediary and the source. The meta information can comprise an identification of the winning experience, the conversation state, most recent conversation domain, and mood at the time of choosing the experience, the geolocation and user profile of the user, and dynamic rate setting information, such as whether there is a zero moment of truth experience delivery premium.

Shortly thereafter, at time t3 the publisher delivers the introductory message of the experience unit. In this scenario, the user provides an engagement spoken expression, also known, using browser terminology, as a spoken click (slick). The slick requests specific information on the rate for the product. At time t5, the publisher sends a web API request to the source for the set rate information. At time t6, the source provides a web API response to the publisher with marked up text for a TTS response. At time t7 the publisher uses TTS software built into its human-machine interface device to synthesize speech in the machine's normal voice and outputs the synthesized speech audio through a speaker.

At time t8 the user provides a second slick, asking to place an order. At time t9 the publisher makes a web API request to an intermediary for order fulfillment. The order fulfillment intermediary processes the order for delivery and, at time t10, provides a web API response to the publisher. At time t11, the publisher performs an action of emailing a receipt and provides a TTS response to the user confirming the order.

At time t12 the publisher reports the conversion to the source for use in analytics, and the publisher, at time t13, outputs a thanking message as TTS speech audio.

Various embodiments have various arrangements of a human-machine interface device and one or more connected servers for publisher, source, and intermediary roles. In one embodiment, a single device communicates with a message server that comprises at least one experience unit.

In another embodiment, sources have multiple divisions in different offices, some having programmers that develop grammars, some having artists that develop message content, and some having departments the combine grammars and content into experience units and combine experience units into campaigns. The source passes the messages to an agency, which stores messages on database servers and accesses them by media buyers who interact with other intermediaries. The media buyers deliver messages and offers to message networks and to third-party trading desks, which manage supply side networks. The trading desks deliver message offers to third-party exchanges, which match offers to opportunities. Experience units that win are sent to publishers with servers distributed geographically for low latency access to users through devices. Experience units are stored locally on different types of devices designed by different consumer product manufacturers, and the experience unit content is delivered to users under the control of the publisher.

Figure 9:
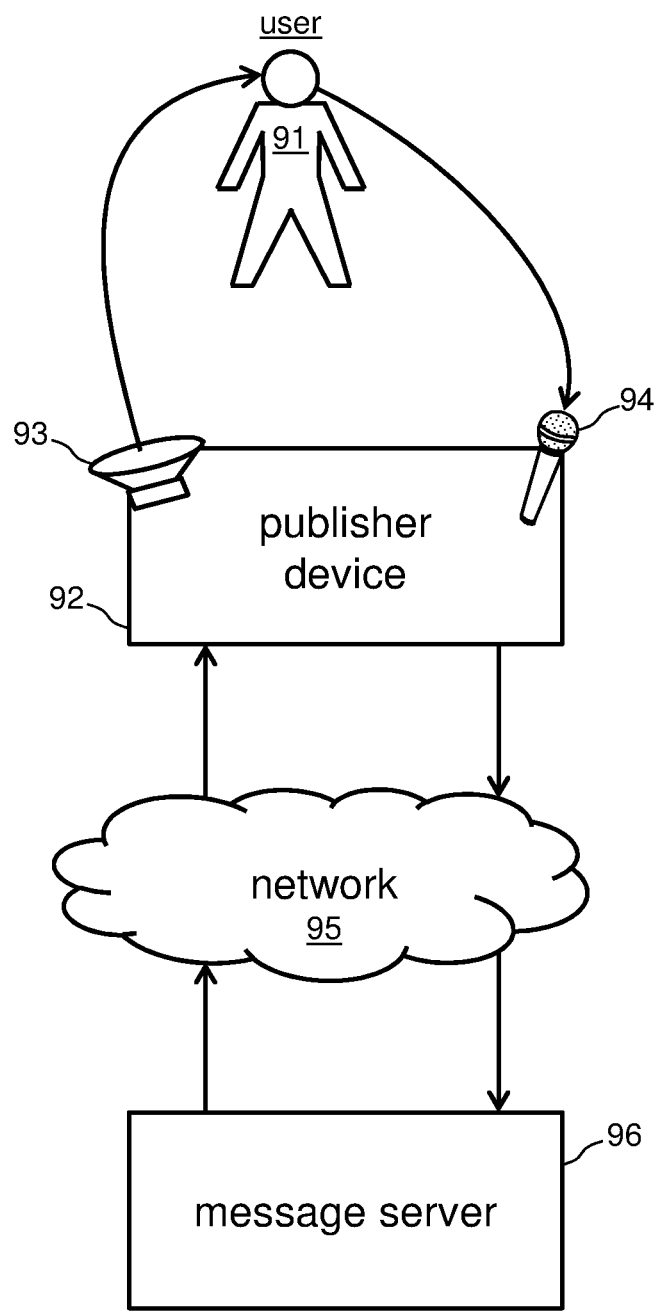
FIG. 9 illustrates a system for interaction between a user and message server, according to an embodiment.

FIG. 9 shows an embodiment. A user 91 communicates with a publisher device 92. It comprises a speaker 93 that delivers audio content to the user 91. The publisher device 92 further comprises a microphone 94, which receives audio that includes natural language speech from the user 91.

The publisher device 92 communicates, through network 95, with message server 96. The message server 96 delivers experience units and executes rate setting functions to select the most valuable experience units to deliver.

Figure 10A:
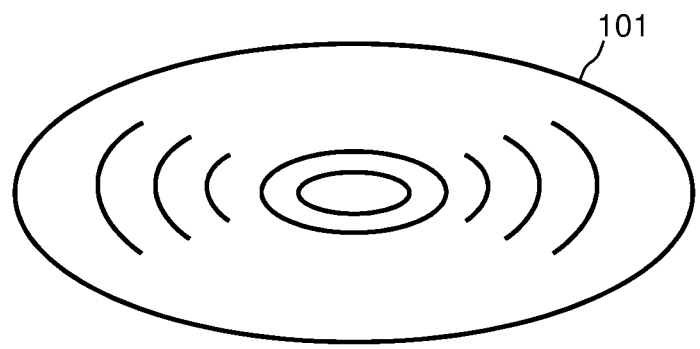
FIG. 10A illustrates a rotating disk non-transitory computer readable medium, according to an embodiment.

FIG. 10A shows a non-transitory computer readable rotating disk medium 101 that stores computer code that, if executed by a computer processor, would cause the computer processor to perform methods or partial method steps described herein.

Figure 10B:
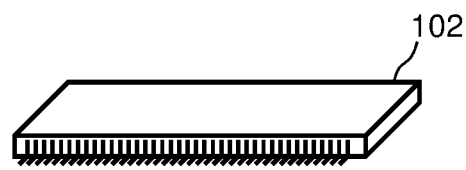
FIG. 10B illustrates a flash random access memory non-transitory computer readable media, according to an embodiment.

FIG. 10B shows a non-transitory computer readable Flash random access memory (RAM) chip medium 102 that stores computer code that, if executed by a computer processor, would cause the computer processor to perform methods or partial method steps described herein.

Figure 10C:
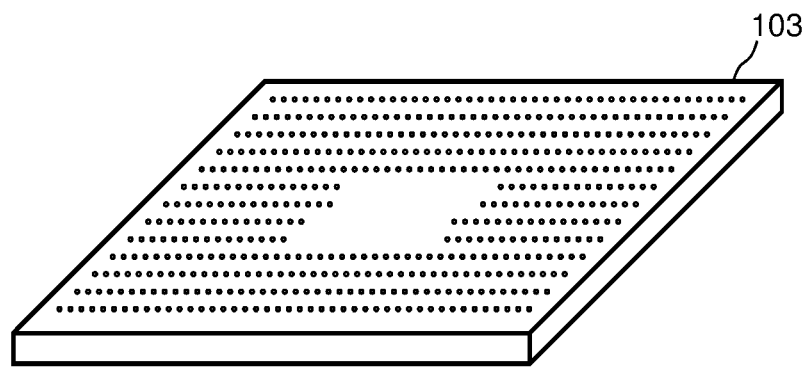
FIG. 10C illustrates the bottom side of a computer processor based system-on-chip, according to an embodiment.
Figure 10D:
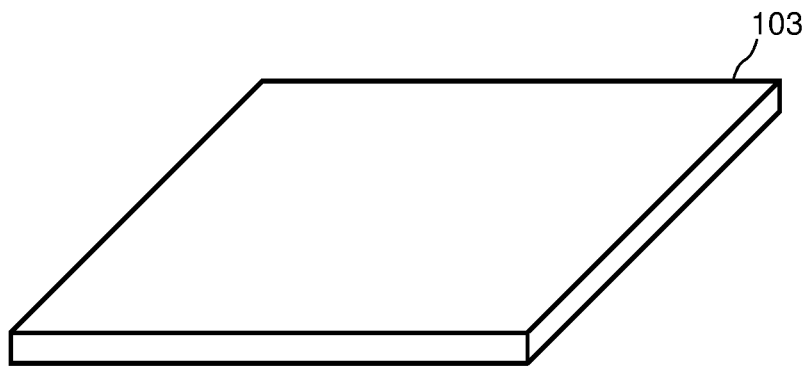
FIG. 10D illustrates the top side of a computer processor based system-on-chip, according to an embodiment.

FIG. 10C shows the bottom (solder ball) side of a packaged system-on-chip (SoC) 103 comprising multiple computer processor cores that comprises a component of some embodiments and that, by executing computer code, perform methods or partial method steps described herein. FIG. 10D shows the top side of the SoC 103.

Figure 11:
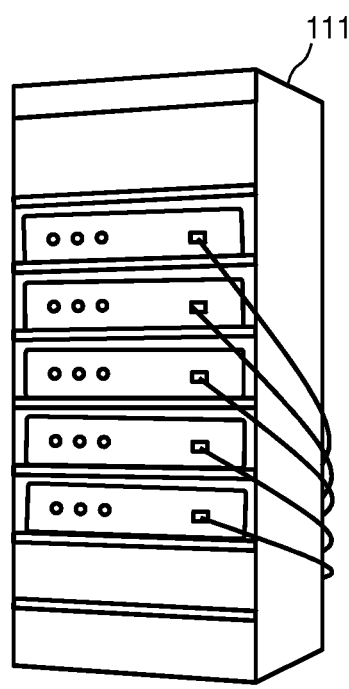
FIG. 11 illustrates a server, according to an embodiment.

FIG. 11 shows a rack-based server system 111, used as a component of various embodiments. Such servers are useful as source servers, publisher servers, and servers for various intermediary functions.

Figure 12:
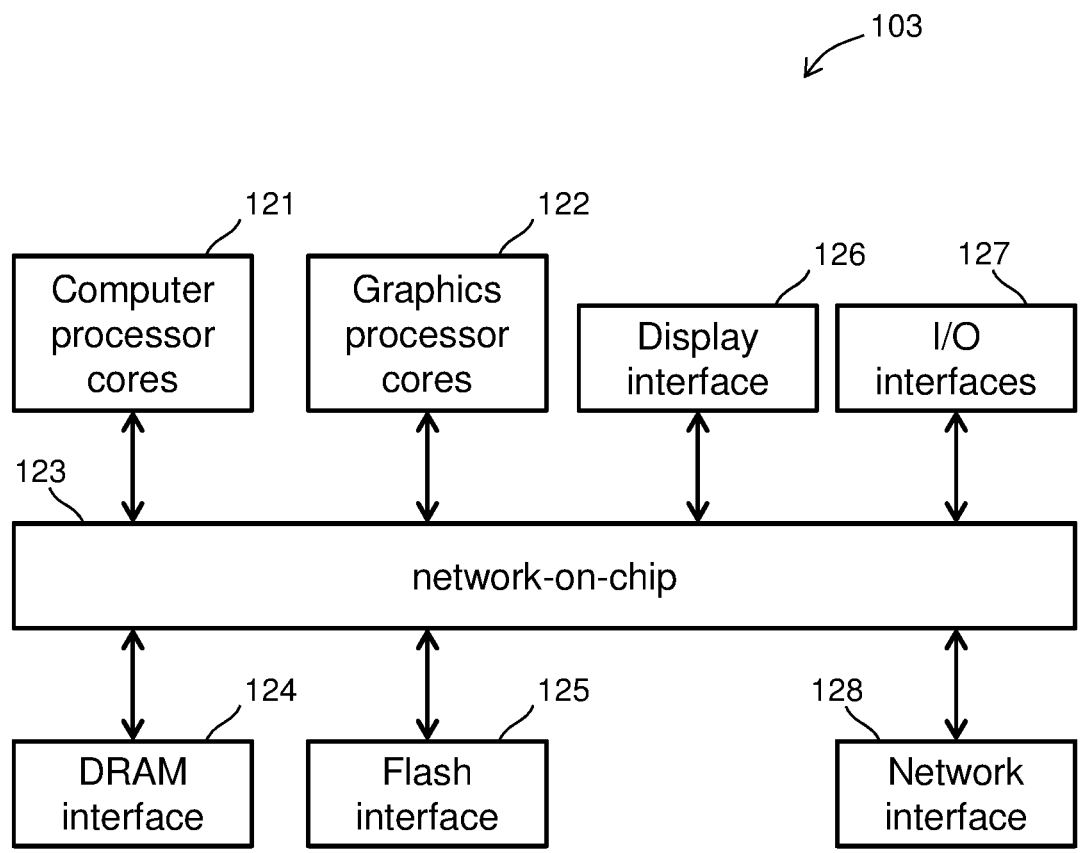
FIG. 12 illustrates a block diagram of a system-on-chip for devices, according to an embodiment.

FIG. 12 shows a block diagram of the cores within the system-on-chip 103. It comprises a multi-core computer processor (CPU) 121 and a multi-core graphics accelerator processor (GPU) 122. The CPU 121 and GPU 122 are connected through a network-on-chip 123 to a DRAM interface 124 and a Flash RAM interface 125. A display interface 126 controls a display, enabling the system to output Motion Picture Experts Group (MPEG) video and Joint Picture Experts Group (JPEG) still image message content. An I/O interface 127 provides for speaker and microphone access for the human-machine interface of a device controlled by SoC 103. A network interface 128 provides access for the device to communicate with servers over the internet.

Figure 13:
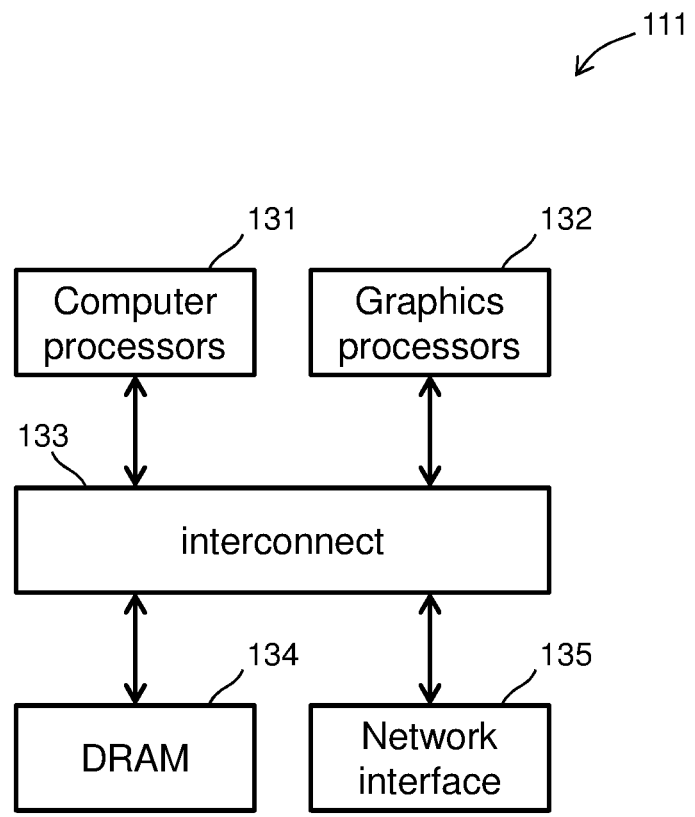
FIG. 13 illustrates a block diagram of a server processor, according to an embodiment.

FIG. 13 shows an embodiment of the server 111. A multiprocessor CPU array 131 and a GPU array 132 connect through a board-level interconnect 133 to a DRAM subsystem 134 that stores computer code and a network interface 135 that provides internet access to other servers or publisher devices.

Various embodiments of devices can be used to publish interactive natural language messages. Some are mundane, and some are exciting.

Figure 14A:
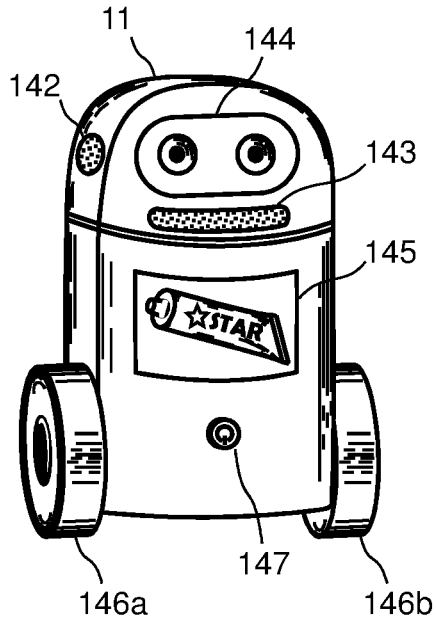
FIG. 14A illustrates components of a conversational robot device, according to an embodiment.

FIG. 14A illustrates components of the exciting anthropomorphic robot assistant natural language conversational publishing device 11. It comprises a speaker 142 on each side of the device in order to output audio. The device comprises a microphone array 143, which comprises several microelectromechanical system (MEMS) microphones, physically arranged to receive sound with different amounts of delay. The device comprises an internal processor that runs software that performs digital signal processing (DSP) to use the microphone array 143 to detect the direction of detected speech. The device 11 further comprises a module 144 with two cameras to provide stereoscopic image and video capture. Further DSP software runs neural network-based object recognition on models trained on human forms in order to detect the location and relative orientation of one or more users. The device 11 further comprises a display screen 145 that, for some experience units, outputs visual message content such as JPEG still images and MPEG video streams. The device 11 further comprises a wheel 146a and a wheel 146b, each of which can turn independently or in unison. By turning in accordance, the device is able to move, such as to follow a user around. By turning independently, the device is able to turn, such as to face and monitor the movement and activity of a user. The device 11 further comprises a power switch 147, which a user can use to shut the device up if it becomes annoying.

Figure 14B:
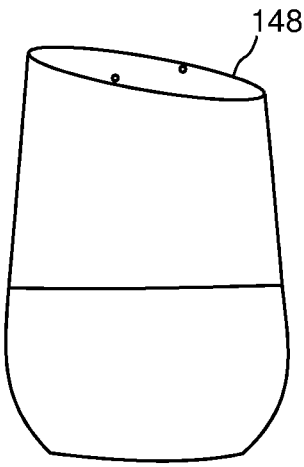
FIG. 14B illustrates a voice assistant device, according to an embodiment.
Figure 14C:
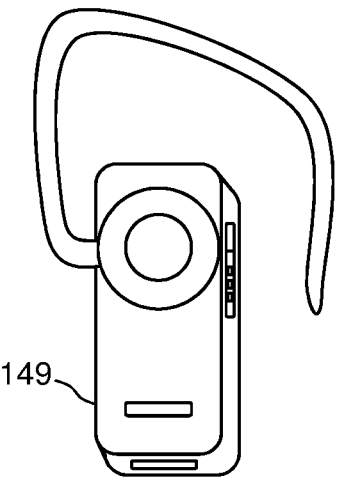
FIG. 14C illustrates an audio earpiece device, according to an embodiment.
Figure 14D:
FIG. 14D illustrates a mobile phone device, according to an embodiment.
Figure 14E:
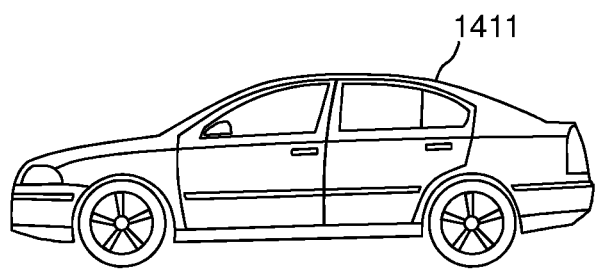
FIG. 14E illustrates an automobile device, according to an embodiment.

FIG. 14B shows an embodiment of a home virtual assistant and music-playing device 148. FIG. 14C shows an embodiment of a Bluetooth-enabled earpiece device 149. FIG. 14D shows an embodiment of a mundane mobile phone 1410. FIG. 14E shows an embodiment of an automobile 1411.

Some embodiments, such as the home virtual assistant 148 give little privacy to its users. Some embodiments, such as earpiece 149 give great privacy to users. Some embodiments, such as the mobile phone 1410 have visual display screens. Some embodiments are screenless, such as the earpiece 149, which has no display screen. Some embodiments, such as the home virtual assistant 148 are stationary. Some embodiments, such as the automobile 1411 are mobile. Some embodiments, such as the mobile phone 1410, are stationary.

Some elements in the flow of messages may be present in different countries, though the functioning of the methods and systems and computer-readable media of message delivery constitute full embodiments. In other words, passing experience units or their components through servers in different countries does not avoid direct infringement of claimed methods, systems, and computer readable media.

Code Examples

In the example experience unit code listing section below is a code listing for an example experience unit. It uses a specialized programming language with syntax that is similar to that of C. Lines 3-55 describe an offer function. The offer value assigned in lines 40-53 is conditioned on whether it is blocked for specific user IDs. The offer value is further conditioned on the privacy level being personal, as opposed to shared or public. The offer value is further conditioned by a mood value being above a threshold. The offer value is further positively affected by the presence in conversation state of specific recent domains, specified in lines 6-8. The offer value is negatively affected by the presence of certain domains in conversation state, specified in lines 9-13. The offer is further positively and negatively affected by the presence of keywords in recent conversation state, the keywords specified in lines 15-27. The offer is further positively and negatively affected by the presence of certain meta information descriptive of the present user, environment, and machine state. The degrees of effect on the offer value of each of different domains, keywords, and meta information are scaled to the ratio of 2.0, 1.5, and 2.5 respectively.

Lines 61-68 describe an introductory message. It includes a reference to an image for display, an audio clip for output, and some text to be spoken, marked up with word emphasis.

The experience unit is restricted to non-offensive content in line 71. The experience unit is assigned to provide a high level of information reporting from publisher to source in line 79. The experience is configured to listen for user responses for 10.0 seconds before considering the conversation to have ended without an engagement in line 82.

Lines 85-96 define a grammar, including certain phrasings with optional wordings. The grammar intents are function calls to functions defined outside of the experience unit or defined below within the experience unit.

Lines 99-119 specify content elements, including video clips, animations, images, video streams, and TTS text with mark-up for conditional content, such as finding the nearest city to a current device latitude and longitude.

Lines 122-167 define custom functions called by the grammar intents. Lines 123-132 specify a function for delivering a sequence of additional information content in response to user requests for more information. Lines 134-137 specify a function for sending a text message. Lines 139-142 specify a function for sending an email message. Lines 144-147 specify a function for looking up the cost of a particular stock keeping unit (SKU) number for the described product. Lines 149-152 specify a function for displaying an image of the product if the publishing device has a display screen. Lines 154-164 specify a function for finding the nearest store with the SKU available, the cost of the product at the nearest store, and whether the product is currently on sale.

Lines 165-167 specify a function for setting an indication, per user ID, of whether the user indicated a non-interest in the product. If so, the message will not be delivered in the future for that user ID.

The code shown in the example below is illustrative of just some capabilities of some embodiments. Sophisticated sources will create experience units with more code, more sophisticated competition, more complex and varied grammars, more dependencies, and more and subtler content. Some embodiments will provide other system functions available for use in experience units and support more complex code constructs.

Some embodiments provide simple templates for less sophisticated sources. For example, an embodiment provides for an SKU and TTS strings and automatically provides capabilities for looking up cost and locations, displaying web content, and providing grammars for answering product-general queries. A message definition for a simple template looks like the following.

OFFER=1.5
SKU=9781542841443
INTRO="did you hear about the new StarPaste?"
MORE="it gives a healthier mouth and more sparkle"

The system provides the grammar, including responding to "tell me more" with TTS of the MORE text and cost lookup using the SKU value.

Example Experience Unit Code Listing

```
001    message StarPaste {
002        float PPKI = 0.25; // default cost per thousand impressions
003        offer{
004            float mood_min: 0.5; // lower threshold for mood
005            // domain of conversation weighting
006            domain cntxt_domain_pos = {"health",
007                                       "grocery",
008                                       "dating"};
009            domain cntxt_domain_neg = {"math",
010                                       "geography",
011                                       "MoonPaste", // a competing product message
012                                       "MoonPaste",
013                                       "MoonPaste"};
014            // keyword weighting
015            words cntxt_words_pos = {"smell",
016                                     "breath",
017                                     "breath", // repetition boosts weight
018                                     "breath",
019                                     "fresh",
020                                     "date",
021                                     "night",
022                                     "sleep",
023                                     "morning"};
024            words cntxt_words_neg = {"directions",
025                                     "text",
```

```
026                        "call",
027                        "problem"};
028            // meta information weighting
029            meta cntxt_meta_pos = {"location=US",
030                        "gender=female",
031                        "age>16",
032                        "environment=home",
033                        "environment=retail-grocery",
034                        "people_present<4",
035                        "male_present=FALSE"};
036            meta cntxt_meta_neg = {"time=9to5",
037                        "environment=restaurant",
038                        "male_present=TRUE"};
039            // don't give add to users in a bad mood
040            float offer_val =
041                check_dont_show(user_id( )) ? 0 :
042                (privacy_level < PERSONAL) ? 0 :
043                (mood < mood_min) ? 0 :
044                PPKI * mood
045                // only give message if recent conversation domains include
046                // more positive than negative domains
047                * 2.0*min(count(cntxt_domain_pos) – count(cntxt_domain_neg),0)
048                // only give message if recent keywords include
049                // more positive than negative domains
050                * 1.5*min(count(cntxt_words_pos) – count(cntxt_words_neg),0)
051                // only give message if recent meta information includes
052                // more positive than negative domains
053                * 2.5*min(count(cntxt_meta_pos) – count(cntxt_meta_neg),0);
054            return offer_val;
055        }
056
057        // introductory message
058        // use image if human-machine interface has a screen
059        // use tts if human-machine interface has TTS service
060        // use audio if tts service is unavailable
061        intro{
062            image = "./media/StarPaste.jpg"; // ref to image content
063            // for devices with audio out but no TTS ability
064            audio = "./media/jingle.mp3";
065            // system outputs speech from the global tts string variable
066            tts = "have you heard about the <emphasis level="strong">new
067                    </emphasis> Star brand StarPaste?";
068        }
069
070        // global setting to block messages with offensive content or grammars
071        non_offensive_restriction = TRUE;
072
073        // global setting to have system report to the source:
074        // every conversation expression (ones that hit the grammar and an
075        // immediately following one if it hits no other grammars)
076        // along with: user ID, time stamp, location, language/accent,
077        // people present (specific ID if detected or number and
078        // characteristics), mood, conversation state
079        reporting_level = HIGH;
080
081        // global setting for seconds with until timeout if no response
082        conversation timeout = 10.0;
083
084        // the grammar
085        grammar{
086            "tell me more" => next_more( );
087            "[can you|please] text [me] a link [to me]" => text_url( );
088            "[can you|please] send [me] a link [to me]" => email_url( );
089            "how much is it" => say_cost( );
090            "[how much|what] does it cost" => say_cost( );
091            "show me" => show_product( );
092            "where can I [buy|get] [it|some]" => where_to_buy( );
093            "i don't care" => set_dont_care( );
094            "dont tell me about it" => set_dont_care( );
095            "i hate [it|that]" => set_dont_care( );
096        }
097
098        // content objects defined for screen and screenless devices
099        content more1 {
100            tts = "it's made with ground unicorn horn for a magic sparkle";
101            video = "./media/sparkle.mpg"; // ref to video content
102        }
103        content more2 {
104            tts = "use it today and get a date by tonight, guaranteed";
```

```
105            flash = "./media/date.swf"; // ref to Flash animation
106        }
107        content more3 {
108            tts = "it's <nearest_city(lat_long( ))>'s silkiest tooth paste";
109            image = "./media/lingerie.gif"; // ref to gif animation of silk
110        }
111        content more4 {
112            tts = rand(
113                "why don't you add it to your cart",
114                "ask your shopping assistant for express delivery",
115                "it's available everywhere that fine toiletries are sold",
116            );
117            // ref to live stream of a celebrity spokesperson
118            stream = "http://www.starpastes.com/celebrity.strm";
119        }
120
121        // grammars can call any message-specific functions
122        int more_idx=0;
123        function next_more {
124            if(more_idx <= 4) more++;
125            case(more_idx){
126                // the deliver function handles output of content objects
127                1: deliver(more1);
128                2: deliver(more2);
129                3: deliver(more3);
130                4: deliver(more4);
131            }
132        }
133        // send SMS
134        function text_url {
135            send_text("http://www.starpastes.com/robo_ad.html");
136            tts = "here you go";
137        }
138        // send email
139        function email_url {
140            send_email("http://www.starpastes.com/robo_ad.html");
141            tts = "done";
142        }
143        // speak cost
144        function say_cost {
145            float cost = get_cost("9781542841443"); // StarPaste SKU
146            tts = "it's only <price>";
147        }
148        // display product on screen
149        function show_product {
150            if(DISPLAY_SCREEN = TRUE)
151                image = "./media/StarPaste.jpg";
152        }
153        // say where to buy the product, cost, and if it's on sale
154        function where_to_buy {
155            // find nearest store with item in stock
156            int store_id = nearest_stock("9781542841443");
157            // check cost at nearest store using store_name function
158            tts = "it's available at <store_name(store_id)> for just
159                <cost_check(store_id, "9781542841443")>";
160            // check whether the item is on sale using store_sales function
161            if (store_sales(store_id, "9781542841443"))
162                tts = "it's on sale at <store_name(store_id)>
163                    <emphasis level = "strong">today</emphasis>";
164        }
165        set_dont_care {
166            set_dont_show(user_id( ));
167        }
168    }
```

What is claimed is:

1. A method of delivering interactive experiences through a human-machine interface, the method comprising:

prior to a user engaging with the human-machine interface, the human-machine interface having not received any voice from the user, delivering an introductory message, which is verbal, defined in a selected interactive experience unit, the selected interactive experience unit being selected from a plurality of interactive experience units, wherein each interactive experience unit includes an offer, a natural language grammar, and an offer value, and wherein the offer value of the selected interactive experience unit is highest relative to each of the plurality of interactive experience units;

receiving a natural language expression from the user after starting delivery of the introductory message;

interpreting the natural language expression according to a natural language grammar defined within the selected interactive experience unit; and responsive to the natural language expression matching the natural language grammar, determining an intent defined in the natural language grammar.

2. The method of claim 1 wherein:
the introductory message is verbal; and
the natural language expression is received as audible speech.

3. The method of claim 1 wherein the human-machine interface is screenless.

4. The method of claim 1 wherein the introductory message comprises text with metadata for speech synthesis.

5. The method of claim 1 wherein the introductory message comprises conditional content that is conditioned by conversation state.

6. The method of claim 5 wherein the condition is a range.

7. The method of claim 1 further comprising detecting a mood, wherein delivering the introductory message is conditioned by the mood.

8. The method of claim 1 further comprising choosing an interactive experience unit with a highest message rate value, wherein message rate values are conditioned by conversation state.

9. The method of claim 1 further comprising taking an action indicated by the intent, wherein the action comprises a script with a plurality of conditional conversation paths.

10. The method of claim 1 further comprising determining an interface privacy level, wherein delivering the introductory message is conditioned by the privacy level.

11. A system comprising:
a natural language processor enabled to interpret natural language expressions according to a natural language grammar;
means to deliver introductory verbal messages, the system having not received any natural language expression from a user, of an interactive experience unit selected from a plurality of interactive experience units, the means to deliver being in communication with the natural language processor, wherein the selected interactive experience unit includes a highest offer value;
means to receive natural language expressions after delivering at least one of the introductory verbal messages to the user prior to user engagement, the means to receive being in communication with the natural language processor; and
means for storing definitions of interactive experience units, the means for storing being in communication with the natural language processor, and each of the plurality of interactive experience units comprising:
an introductory verbal message;
an offer;
an offer value; and
a natural language grammar comprising an intent that indicates an action.

12. The system of claim 11 further comprising:
means to execute the actions, the means to execute being in communication with the natural language processor and the execution being conditioned by a natural language expression matching a grammar.

* * * * *